US008965545B2

(12) United States Patent
Lloyd et al.

(10) Patent No.: US 8,965,545 B2
(45) Date of Patent: *Feb. 24, 2015

(54) PROGRESSIVE ENCODING OF AUDIO

(75) Inventors: Matthew I. Lloyd, Cambridge, MA (US); Martin Jansche, New York, NY (US)

(73) Assignee: Google Inc., Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/895,258

(22) Filed: Sep. 30, 2010

(65) Prior Publication Data

US 2012/0083910 A1    Apr. 5, 2012

(51) Int. Cl.
G06F 17/00    (2006.01)
G10L 15/20    (2006.01)
G10L 15/18    (2013.01)
G10L 15/22    (2006.01)

(52) U.S. Cl.
CPC .................. *G10L 15/20* (2013.01); *G10L 15/18* (2013.01); *G10L 2015/223* (2013.01)
USPC .......................................................... 700/94

(58) Field of Classification Search
USPC .......................................................... 700/94
See application file for complete search history.

(56) References Cited

U.S. PATENT DOCUMENTS

| 6,393,398 | B1 | 5/2002 | Imai et al. |
| 6,973,428 | B2 | 12/2005 | Boguraev et al. |
| 7,027,987 | B1 | 4/2006 | Franz et al. |
| 7,143,432 | B1 * | 11/2006 | Brooks et al. ................. 725/105 |
| 7,526,348 | B1 * | 4/2009 | Marshall et al. ................. 700/94 |
| 7,729,917 | B2 | 6/2010 | Miyamoto et al. |
| 7,870,562 | B1 * | 1/2011 | Hansen-Sturm ............... 719/314 |
| 8,102,916 | B1 * | 1/2012 | Masterson et al. ........ 375/240.16 |
| 2003/0216824 | A1 * | 11/2003 | Chu et al. .......................... 700/94 |
| 2004/0179515 | A1 * | 9/2004 | Kamani et al. ................. 370/352 |
| 2004/0181394 | A1 * | 9/2004 | Kim et al. ..................... 704/200.1 |
| 2005/0088934 | A1 * | 4/2005 | McPherson et al. ........ 369/47.16 |
| 2005/0270938 | A1 * | 12/2005 | Otomo et al. ............... 369/47.19 |
| 2006/0174267 | A1 * | 8/2006 | Schmidt .......................... 725/39 |
| 2007/0073718 | A1 | 3/2007 | Ramer et al. |
| 2007/0274383 | A1 * | 11/2007 | Yu et al. ..................... 375/240.11 |
| 2008/0144713 | A1 * | 6/2008 | Kimmich et al. ......... 375/240.02 |
| 2009/0219994 | A1 * | 9/2009 | Tu et al. ................... 375/240.08 |
| 2011/0018998 | A1 * | 1/2011 | Guzik ........................... 348/143 |
| 2012/0084089 | A1 | 4/2012 | Lloyd et al. |
| 2012/0297081 | A1 * | 11/2012 | Karlsson et al. .............. 709/231 |

OTHER PUBLICATIONS

The MPEG-4 Book: Pereira and Ebrahimi: Copyright 2002.*

(Continued)

*Primary Examiner* — Paul McCord
(74) *Attorney, Agent, or Firm* — Fish & Richardson P.C.

(57) ABSTRACT

The present disclosure includes processing a signal to generate a first sub-set of data, transmitting the first sub-set of data for generation of a reconstructed audio signal, the reconstructed audio signal having a fidelity relative to the signal, processing the signal to generate a second sub-set of data and a third sub-set of data, the second sub-set of data defining a second portion of the signal and comprising data that is different than data of the first sub-set of data, and the third sub-set of data defining a third portion of the signal and comprising data that is different than data of the first and second sub-sets of data, comparing a priority of the second sub-set of data to a priority of the third sub-set of data, and transmitting one of the second sub-set of data and the third sub-set of data over the network for improving the fidelity.

26 Claims, 10 Drawing Sheets

(56) References Cited

OTHER PUBLICATIONS

Authorized Officer Lingfei Bai; International Preliminary Report on Patentability dated Apr. 11, 2013 for PCT/US2011/052807, 7 pages.

Authorized Officer Andre Robinson; International Search Report and the Written Opinion dated Apr. 26, 2012 for PCT/US2011/052807, 9 pages.

* cited by examiner

PROGRESSIVE ENCODING OF AUDIO

BACKGROUND

This specification generally relates to transmitting audio data.

An increasing number of users are utilizing voice recognition applications on computing devices. The use of a voice recognition application allows a user to dictate speech input for subsequent processing into text for input to an application program. This enables a user to provide input data or commands to an application in a "hands free" mode of operation. For example, a user can run a voice search application on a mobile phone. The mobile phone can include a microphone for audio input and a display device (e.g., a touchscreen) for displaying output to the user. The user can speak the topic they would like to search into the microphone (e.g., "Presidents of the United States"). The mobile phone can record the audio input stream (the user's spoken words). The mobile phone can digitize the recorded audio input stream. The mobile phone can transmit the audio input stream using a mobile communication network (e.g., a third generation (3G) network) to a receiver included in a speech recognition server. The speech recognition server can further process the received audio input stream in order to recognize the spoken words. A search engine application can receive the recognized spoken words as text input from the speech recognition server. The mobile phone can receive the results of the voice search from the search engine for display to the user on the display device (e.g., information regarding the Presidents of the United States, a list of the Presidents of the United States, etc.).

SUMMARY

According to one innovative aspect of the subject matter described in this specification, a user can utilize a voice search application on a mobile device (e.g., a mobile phone) to request information verbally regarding a topic of interest. For example, the user is a passenger in a car, driving with their spouse, and they are talking about where to spend time on their next vacation. The user would like information regarding the best beaches in the United States. The user, interacting with the voice search application on their mobile phone, speaks the words "best beaches in the United States" into the microphone on their mobile phone. The user expects the results of the voice search almost immediately. The mobile phone can transmit the input speech using a mobile communications network (the same network used to place and receive phone calls) to a server provided by the mobile communication service provider. The server can recognize the input speech, run a search engine using the recognized speech input and provide the search results to the user on their mobile phone. The mobile phone can display the search results on the display screen of the mobile phone as a list of web site links the user can visit to provide the requested information. However, as the user is traveling in the car the quality and speed of the mobile communications network can vary affecting the time between the spoken words and the search results. The mobile phone can provide the input speech to the server as a series of blocks where each block provides additional incremental data regarding the input speech. A speech recognition application on the server can attempt to recognize the input speech after receiving each block of data. Once the speech recognition application is confident it has successfully recognized the input speech it no longer needs to receive and process subsequent data blocks of input speech from the mobile phone. Therefore, the user can receive the results of the voice search more quickly than if the mobile phone sent the entire input speech to the server.

In general, innovative aspects of the subject matter described in this specification may be embodied in methods that include the actions of retrieving a digital audio signal, processing the digital audio signal to generate a first sub-set of data, the first sub-set of data defining a first portion of the digital audio signal, transmitting the first sub-set of data for generation of a reconstructed audio signal, the reconstructed audio signal having a fidelity relative to the digital signal, processing the digital audio signal to generate a second sub-set of data and a third sub-set of data, the second sub-set of data defining a second portion of the digital audio signal and comprising data that is different than data of the first sub-set of data, and the third sub-set of data defining a third portion of the digital audio signal and comprising data that is different than data of the first and second sub-sets of data, comparing a priority of the second sub-set of data to a priority of the third sub-set of data, and transmitting, based on the comparing, one of the second sub-set of data and the third sub-set of data over the network for improving the fidelity of the reconstructed signal. Other implementations of this aspect include corresponding systems, apparatus, and computer programs, configured to perform the actions of the methods, encoded on computer storage devices.

These and other implementations may each optionally include one or more of the following features. For instance, in some implementations, the second sub-set of data includes more data than the first sub-set of data; the actions further include subsequently transmitting the other of the second sub-set of data and the third sub-set of data over the network for further improving the fidelity of the reconstructed audio signal; wherein the third sub-set of data includes more data than each of the second sub-set of data and the first sub-set of data; wherein processing the digital audio signal to generate a first sub-set of data includes: determining an original sampling rate of the digital audio signal, and down-sampling data of the digital audio signal at a first sampling rate that is less than the original sampling rate to provide the first sub-set of data, wherein processing the digital audio signal to generate a second sub-set of data includes: up-sampling data of the first sub-set of data at the original sampling rate to provide first up-sampled data, subtracting the first up-sampled data from data of the digital audio signal to provide first residual data, and down-sampling the first residual data at a second sampling rate that is greater than the first sampling rate and that is less than the original sampling rate to provide the second sub-set of data, wherein processing the digital audio signal to generate a third sub-set of data includes: up-sampling data of the second sub-set of data at the original sampling rate to provide second up-sampled data, and subtracting the second up-sampled data from the first residual data to provide second residual data, the second residual data defining the third sub-set of data; wherein processing the digital audio signal to generate a first sub-set of data includes: determining a bit-depth of data of the digital audio signal, and extracting a first bit of each sample of the data of the digital audio signal to provide first extracted data, the first extracted data defining the first sub-set of data and the first bit being determined based on the bit-depth, wherein processing the digital audio signal to generate a second sub-set of data comprises extracting a second bit of each sample of the data of the data set to provide second extracted data, the second extracted data defining the second sub-set of data and the second bit being determined based on the bit-depth; the actions further include: receiving a signal, and ceasing processing of the digital audio signal to generate sub-sets of data in response to receiving the signal, wherein the signal indicates that a fidelity of reconstructed signal is greater than a threshold fidelity; and the actions further include compressing the first sub-set of data and the one of the second sub-set of data and the third sub-set of data.

In general, other innovative aspects of the subject matter described in this specification may be embodied in methods that include the actions of receiving a first sub-set of data, the first sub-set of data having been generated based on a digital audio signal, processing the first sub-set of data to generate a reconstructed audio signal, the reconstructed signal having a fidelity relative to the digital audio signal, receiving one of a second sub-set of data and a third sub-set of data based on a comparison of a priority of the second sub-set of data to a priority of the third sub-set of data, the second sub-set of data defining a second portion of the digital audio signal and comprising data that is different than data of the first sub-set of data, and the third sub-set of data defining a third portion of the digital audio signal and comprising data that is different than data of the first and second sub-sets of data, and processing the one of the second sub-set of data and third sub-set of data to improve the fidelity of the reconstructed audio signal. Other implementations of this aspect include corresponding systems, apparatus, and computer programs, configured to perform the actions of the methods, encoded on computer storage devices.

These and other implementations may each optionally include one or more of the following features. For instance, in some implementations, the second sub-set of data includes more data than the first sub-set of data; the actions further include: receiving the other of the second sub-set of data and the third sub-set of data, and processing the other of the second sub-set of data and the third sub-set of data to further improve the fidelity of the reconstructed audio signal; the third sub-set of data includes more data than each of the second sub-set of data and the first sub-set of data; processing the first sub-set of data includes up-sampling data of the first data sub-set at an original sampling rate of the data set to provide first up-sampled data, the reconstructed signal being generated based on the first up-sampled data, and the first data sub-set having been generated using a first sampling rate that is less than the original sampling rate, wherein processing one of the second sub-set of data and the third sub-set of data comprises up-sampling data of the one of the second sub-set of data and the third sub-set of data at the original sampling rate to provide second up-sampled data, the second up-sampled data being added to the reconstructed audio signal to improve the fidelity of the reconstructed audio signal, and the one of the second sub-set of data and the third sub-set of data having been generated using a second sampling rate that is less than the original sampling rate and that is greater than the first sampling rate, the actions further include: up-sampling data of the other of the second sub-set of data and the third sub-set of data at the original sampling rate to provide third up-sampled data, and adding the third up-sampled data to the reconstructed audio signal to further improve the fidelity of the reconstructed audio signal; the first sub-set of data is generated by extracting a first bit of each sample of data of the digital audio signal to provide first extracted data, the first extracted data defining the first sub-set of data and the first bit being determined based on a bit-depth, the second sub-set of data is generated by extracting a second bit of each sample of data of the digital audio signal to provide second extracted data, the second extracted data defining the second sub-set of data and the second bit being determined based on the bit-depth; the actions further include: determining that the fidelity of the reconstructed audio signal has achieved a threshold fidelity, generating a signal, and transmitting the signal over a network for ceasing transmission of subsequent sub-sets of data; and the actions further include decompressing the first sub-set of data and the one of the second sub-set of data and third sub-set of data.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1A:
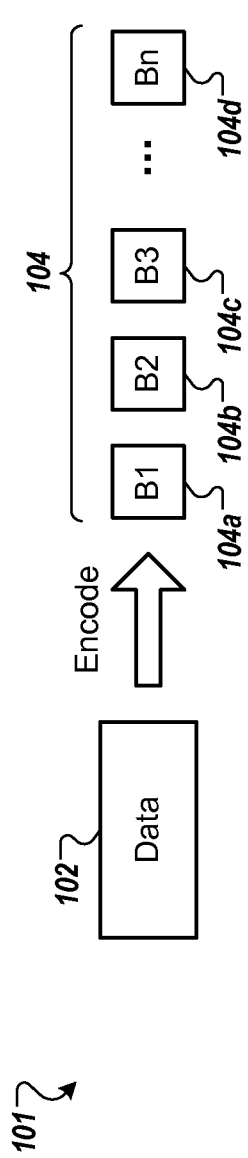
FIG. 1A is a diagram demonstrating encoding an audio input stream as a sequence of data blocks.

A distributed interactive speech application can record an audio or audiovisual signal in a first location and transmit it for further processing to a second location. In some implementations, the second location is remote from the first location. Each location can be a computing device that includes a transmitter and a receiver (or a transceiver). The first location can record, digitize and then transmit the digitized audio signal by way of a network to the second location. The second location can further process the received audio signal for use in one or more applications available at the second location. In some implementations, the first location can be a mobile computing device that records an audio input stream from a user (spoken words). The second location can be an application server. The application server can include a speech recognition application. The mobile computing device can digitize and transmit the recorded audio input stream by way of a mobile communication network to the application server. The speech recognition application can further process the received audio input stream in order to recognize the recorded spoken words. One or more applications on the application server can receive the recognized spoken words as text input from the speech recognition application. In some cases, the application can interpret the input text as one or more commands for processing by the application.

The first location can encode the audio input stream before transmitting the audio input stream to the second location using an audio encoding method. The audio encoding method can preserve the quality and bitrate of the audio input stream. In some situations, the network connection between the first location and the second location can have limited bandwidth. In some situations, the reliability of the network connection may be compromised. For example, a user is using a voice search application on a mobile phone while riding in a car. The overall quality of the mobile communication network may fluctuate as the user travels. The user may expect an action to be performed within a particular time after inputting the audio input stream (e.g., the user receives the results of the voice search). The user may experience a large time delay between the entry of the audio input stream (e.g., speaking the search terms into the microphone of the mobile computing device) and the receipt of the desired response (e.g., the results of the voice search displayed on the display device of the mobile computing device). The large time delay can be due to the poor bandwidth of the network connection between the mobile phone and a remote server. The encoding of the audio input stream at a high quality level and bitrate can also add to the time delay as the high quality level and bitrate can result in a large amount of data transmitted across the network from the mobile phone to the remote server.

In some implementations, the first location can provide an audio encoding method for encoding the audio input stream. Encoding can reduce the latency between the input of the audio stream to the first location (e.g., speaking into the microphone of the mobile computing device) and the receipt of the information regarding the audio input stream at the first location from the second location (e.g., the results of the voice search displayed on the display device of the mobile computing device). In addition, the audio encoding method can preserve the fidelity of the audio input stream, while transmitting the encoded audio data across a variety of networks with varying bandwidths and quality levels. The audio encoding method can encode the audio input stream as a sequence of data blocks where each subsequent data block includes information about the audio input stream not present in the previous data block. In addition, the size of each data block (the amount of data included in each data block) can increase with each subsequent data block. The second location can reconstruct the entire audio input stream at a low quality level from the first block of encoded audio data. The second location can add each subsequent block of encoded audio data to the one or more previous blocks of encoded audio data in order to refine the reconstruction of the audio input stream to have progressively higher fidelity.

In some implementations, each data block in the sequence of data blocks can include a priority. The priority can indicate the order of transmission of the data blocks from the first location to the second location (e.g., highest priority blocks are transmitted first followed by the lower priority blocks). In some cases, a data block can include metadata. The metadata can assist the speech recognition application in the second location with recognizing the encoded audio input stream. For example, metadata can include but is not limited to microphone characteristics, derived noise profiles, and audio data samples taken before the user began speaking (prologue audio). The first location can transmit the data blocks to the second location until the speech recognition application receives sufficient information to reconstruct the audio input stream at a high enough confidence level in order to provide accurate speech recognition. In some situations, the first location can transmit data blocks to the second location until there are no longer additional data blocks for transmission. In some situations, the first location can transmit data blocks to the second location until a timer expires, where the time set for the timer is a maximum user-perceived acceptable latency time from user speech input until receipt of the results.

FIG. 1A is a diagram 100 demonstrating encoding an audio input stream 102 as a sequence of data blocks 104. An audio encoding method can encode the audio input stream 102 as a sequence of data blocks 104 where each subsequent data block includes information about the audio input stream 102 not present in the previous data block. The audio encoding method can encode the audio input stream 102 as a sequence of data blocks 104 where n number of data blocks can represent the complete audio input stream 102.

Figure 1B:
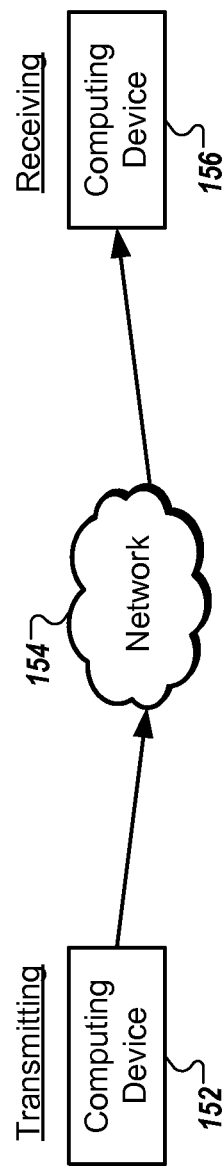
FIG. 1B is a diagram of an exemplary system that includes a computing device for transmitting data blocks to a computing device for receiving data blocks using a network.

FIG. 1B is a diagram of an exemplary system 150 that includes a first computing device 152 for transmitting data blocks to a second computing device 156 for receiving the data blocks using a network 154. Referring to FIGS. 1A and 1B, the first computing device 152 encodes the audio input stream 102 as a sequence of data blocks 104. The first computing device 152 sequentially transmits the data blocks 104 to the second computing device 156 by way of the network 154. A speech recognition application on the second computing device 156 reconstructs a portion of the audio input stream from a first data block 104a where the quality level of the reconstructed portion of the audio input stream is below that of the original audio input stream 102. Subsequent data blocks in the sequence of data blocks 104 can refine the reconstructed audio input stream to have progressively higher fidelity. For example, data block 104b includes data for the audio input stream 102 not included in data block 104a. In addition, the sizes of each data block (the amount of data included in each data block) can increase with each subsequent data block. For example, data block 104b can include more data for the audio input stream 102 than the amount of data included in data block 104a.

The speech recognition application can reconstruct the entire audio input stream at a low quality level from a first block of encoded audio data (e.g., data block 104a). The speech recognition application can add each subsequent block of encoded audio data to the one or more previous blocks of encoded audio data in order to refine the reconstruction of the audio input stream to have progressively higher fidelity. For example, the speech recognition application can add data block 104b to data block 104a. The addition of data block 104b to data block 104a further refines data block 104a. The speech recognition application can add data block 104c to the sum of data block 104a and data block 104b to further refine the reconstruction of the audio input stream. In some implementations, the second computing device 156 can request the transmitting of each additional data block from the first computing device 152 until the speech recognition application is confident is has received sufficient information regarding the audio input stream 102 in the data blocks to accurately recognize the input speech. In some implementations, the first computing device 152 can transmit the entire sequence of data blocks (e.g., data blocks 104) to the second computing device 156. In some implementations, the first computing device 152 can transmit data blocks to the second computing device 156 until a preset amount of time expires. The amount of time can be determined based on a maximum user-perceived acceptable latency time from the input of the user speech on the first computing device 152 until the receipt of the results of the speech recognition application from the second computing device 156 by the first computing device 152.

In some implementations, the information in one or more data blocks in a sequence of data blocks can be metadata. For example, the metadata can include but is not limited to microphone characteristics of an input device, derived noise profiles, and prologue audio, which is audio data samples taken before the user began speaking. The speech recognition application in the second computing device 156 can use the metadata to assist in recognizing the encoded audio data provided in the additional data blocks transmitted from the first computing device 152.

In some implementations, each data block in the sequence of data blocks 104 can include a priority. The priority can indicate the order of transmission of the data block from the first computing device 152 to the second computing device 156. The first computing device can transmit the data blocks with higher priority before data blocks with lower priority. In some implementations, the first computing device 152 may encode the audio input stream 102 as a sequence of data blocks 104 where the audio encoding method assigns each data block a priority as it generates the data blocks. For example, the first computing device 152 encodes the audio input stream 102 in four data blocks (e.g., data blocks 104a-d, where the number of data blocks, n, is equal to four). The audio encoding method assigns progressively lower priorities to each data block 104a-d as it generates each data block. The first data block 104a of the encoded audio data can provide a low quality outline of the audio input stream. The audio encoding method assigns the first data block 104a the highest priority. Each subsequent data block 104b, 104c, 104d provides additional information not present in the preceding data block and is assigned a progressively lower priority (e.g., data block 104b has a higher priority than data block 104c which has a higher priority than data block 104d). The speech recognition application on the second computing device 156 can reconstruct the audio input stream in the order in which the second computing device 156 receives the data blocks from the first computing device 152. The speech recognition application reconstructs the audio input stream at a first quality level using data block 104a. Subsequent data blocks 104b, 104c, 104d provide progressively higher fidelity to the reconstructed audio input stream of data block 104a.

In some implementations, the first computing device 152 may encode the audio input stream 102 as a sequence of data blocks 104 where the audio encoding method can generate all the data blocks prior to assigning their priority. For example, the first computing device 152 encodes the audio input stream 102 in three data blocks (e.g., data blocks 104a, 104c, and 104d) where a fourth data block, data block 104b, consists of metadata (e.g., audio prologue information). The audio encoding method can assign the data blocks 104a-d progressively lower priorities. In the case of metadata blocks, it may be necessary to transmit at least one block of encoded audio input data prior to transmitting the metadata block, as the second computing device 156 may not use the information in the metadata block alone to recognize the audio input stream.

Figure 2:
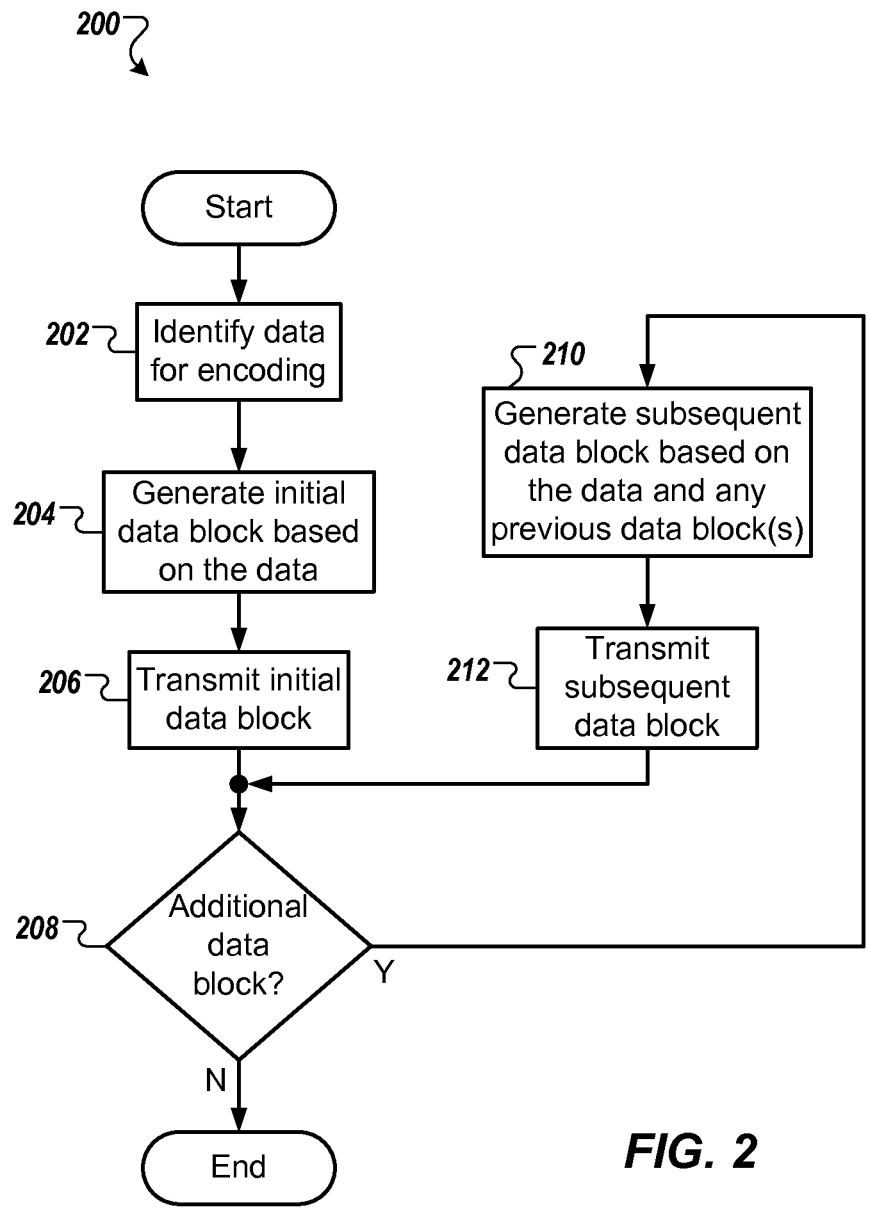
FIG. 2 is a flowchart of an exemplary process for transmitting data blocks.

FIG. 2 is a flowchart of an exemplary process 200 for transmitting data blocks. For example, referring to FIGS. 1A and 1B, the first computing device 152 can perform the process 200 in order to encode the input audio stream 102, generate data blocks 104, and transmit data blocks 104. The process 200 begins by identifying data for encoding (step 202). For example, the process 200 can identify input audio stream 102 as the input audio data for encoding. The process 200 generates an initial data block based on the data (step 204). For example, the process 200 can generate data block 104a based on the encoded input audio stream. The initial data block is transmitted (step 206). For example, the first computing device 152 can transmit data block 104a using network 154 to the second computing device 156. In step 208, if additional data blocks can be generated for the data, the process 200 generates a subsequent data block based on the data and any previous data blocks (step 210). For example, the first computing device 152 can generate an additional data block for the encoded input audio stream (e.g., data block 104b). The data in the subsequent data block 104b can be data not previously included in the previous data block 104a. In addition, the size of the data block 104b may be larger than the size of the previous data block 104a. The data block 104b can provide additional information to combine with data block 104a to provide a higher quality representation of the input audio stream. The subsequent data block is transmitted (step 212). For example, the first computing device 152 can transmit data block 104b to the second computing device 156. The second computing device 156 can use the data in both the data block 104a and the data block 104b in order to recognize the speech of the input audio stream. The process 200 continues to step 208. If in step 208, additional data blocks are available, the process 200 continues to step 210. If in step 208, no additional data blocks can be generated for the data, the process 200 ends.

In some implementations, the first computing device 152 can base the determination for generation of additional data blocks (step 208) on the receipt of a request for an additional data block from the second computing device 156. For example, if a voice recognition application on the second computing device 156 can recognize the input audio stream prior to the first computing device transmitting all available data blocks, the second computing device 156 can instruct the first computing device 152 not to transmit subsequent data blocks. In some implementations, the first computing device 152 can base the determination for generation of additional data blocks (step 208) on a timer. If the set time for the timer has expired, the process 200 may no longer generate and transmit additional data blocks.

Figure 3:
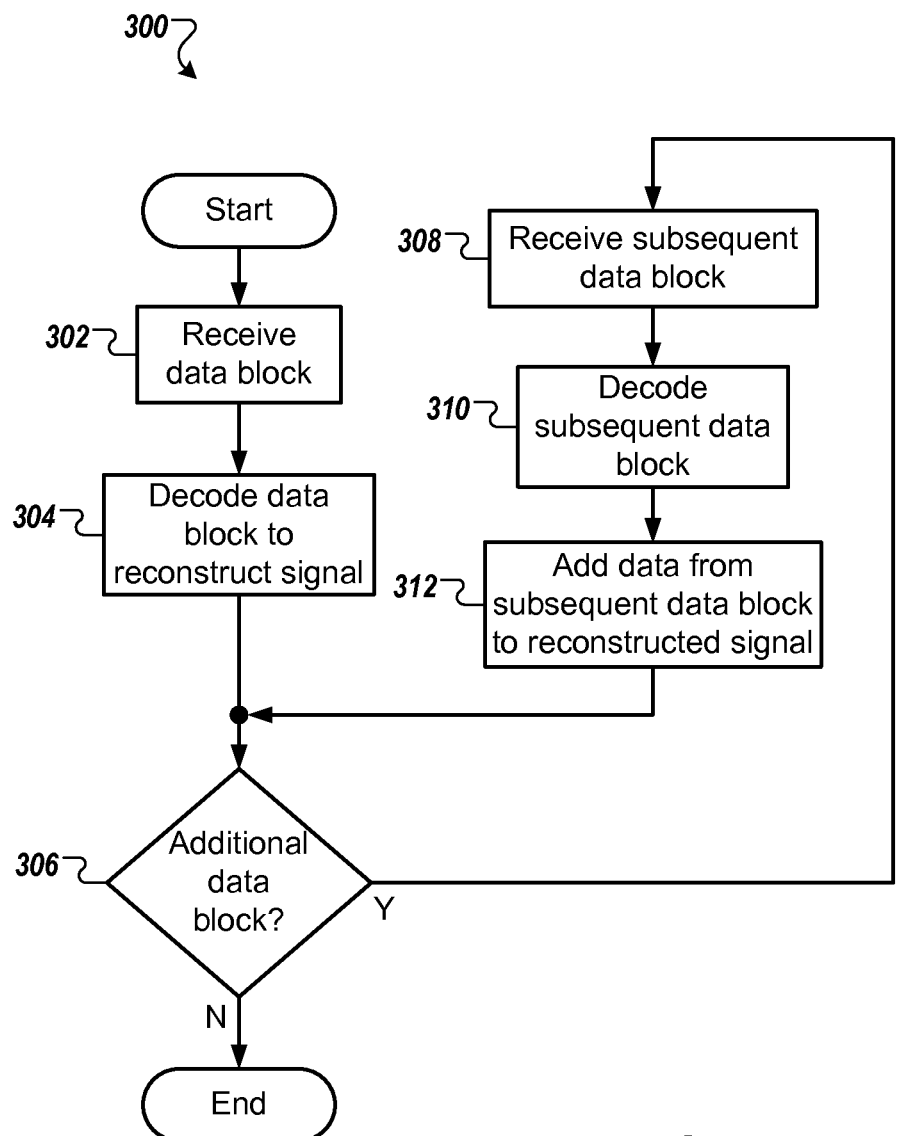
FIG. 3 is a flowchart of an exemplary process for receiving data blocks.

FIG. 3 is a flowchart of an exemplary process 300 for receiving data blocks. For example, referring to FIGS. 1A and 1B, the second computing device 156 can perform the process 300 in order to receive, decode and reconstruct the input audio stream 102 for use in a voice recognition application. The process 300 begins by receiving a data block (step 302). For example, the first computing device 152 using network 154 transmits data block 104a to the second computing device 156, which receives the data block 104a. The process 300 decodes the data block to reconstruct the signal (step 304). For example, the second computing device 156 decodes data block 104a to reconstruct a low quality version of the input audio stream 102. In step 306, if additional data blocks are available, the process 300 receives a subsequent data block (step 308). For example, the second computing device 156 receives data block 104b. The process 300 decodes the subsequent data block (step 310). For example, the second computing device 156 decodes the data block 104b. The process 300 adds the data from the subsequent data block to the reconstructed signal (step 312). This results in an update of the reconstructed signal where the subsequent data block provides additional data regarding the original input audio stream. For example, the decoded data from data block 104b is added to the decoded data from data block 104a resulting in an updated reconstructed signal that includes the additional data provided by data block 104b to provide a higher quality version of the input audio stream 102.

In some implementations, step 304 of the process 300 can provide a low quality version of the input audio stream as an initial reconstructed signal to a voice recognition application. If the voice recognition application can recognize the speech from the reconstructed signal, the second computing device 156 can inform the first computing device 152 that successful recognition has occurred. The first computing device 152 may no longer provide subsequent data blocks to the second computing device 156. In some implementations, step 312 of the process 300 can provide a version of the reconstructed signal to a voice recognition application. If the voice recognition application can recognize the speech from the version of the reconstructed signal provided by step 312, the second computing device 156 can inform the first computing device 152 that successful recognition has occurred. The first computing device 152 may no longer provide additional subsequent data blocks to the second computing device 156. If the voice recognition application cannot recognize the speech from the version of the reconstructed signal provided by step 312, the process 300 can continue by receiving a subsequent data block. Step 312 of the process 300 can add data from each subsequent data block received to the version of the reconstructed signal creating a progressively higher quality version of the reconstructed signal for input to the voice recognition application. The voice recognition application can receive each version of the reconstructed signal and if successful recognition occurs, subsequent data may no longer be needed from the first computing device 152.

In some implementations, the second computing device 156 can decide to no longer request or receive additional data blocks from the first computing device 152. This second computing device 156 can base this decision on a timer. For example, a set time for a timer can be based on the acceptable latency time between receipt of the first data block by the second computing device 156 and transmission of the results requested by the speech of the input audio stream 102 by the second computing device 156. In such cases, the voice recognition application provides the best possible recognition of the provided reconstructed signal, where the provided reconstructed signal may be at a lower quality level than the original input audio stream 102.

Figure 4:
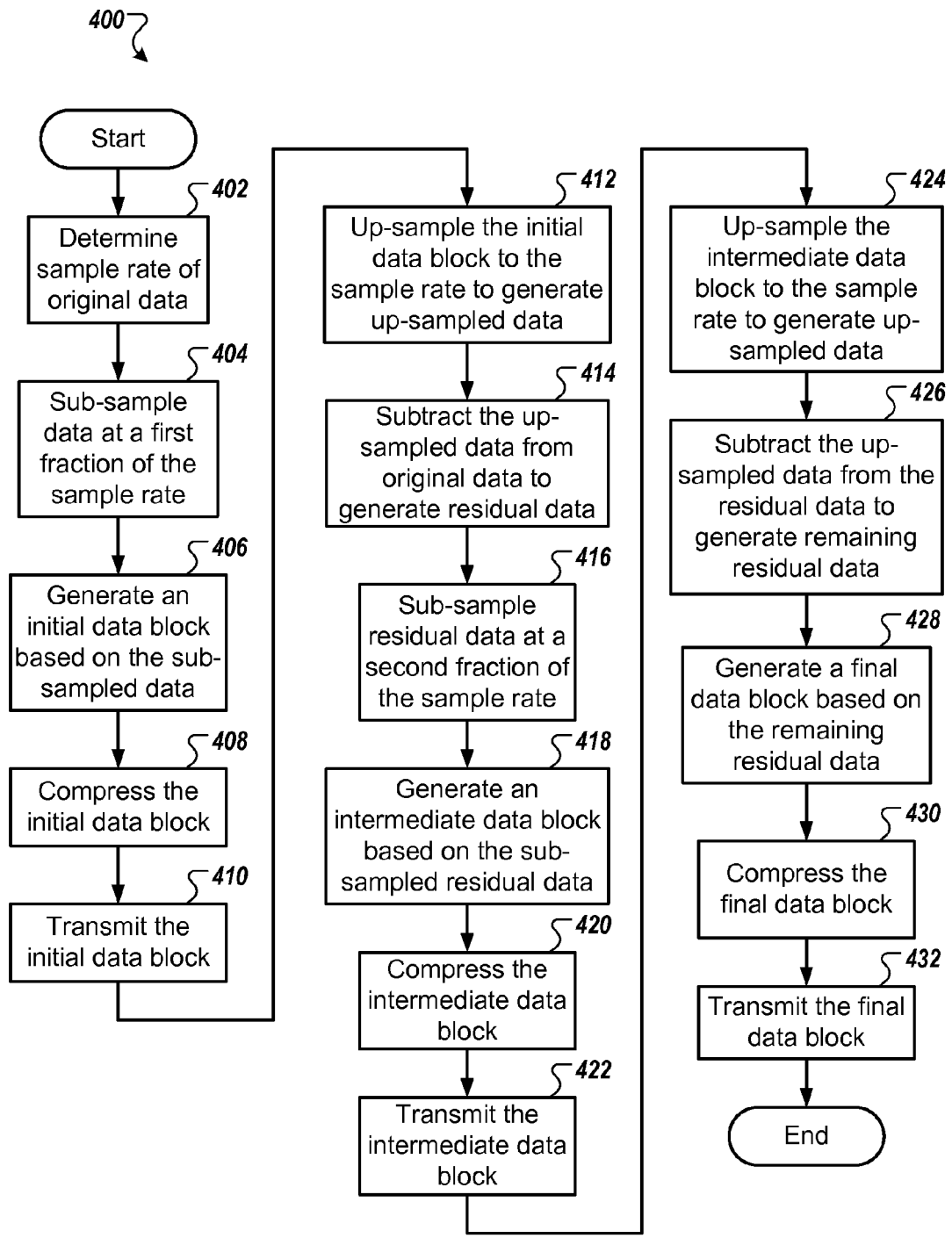
FIG. 4 is a flowchart of an exemplary audio encoding process using a sample rate with linear interpolation.

FIG. 4 is a flowchart of an exemplary audio encoding process 400 using a sample rate with linear interpolation. For example, referring to FIGS. 1A and 1B, the first computing device 152 can perform the process 400 in order to encode the input audio stream 102, generate the data blocks 104, and transmit the data blocks 104.

Figure 5:
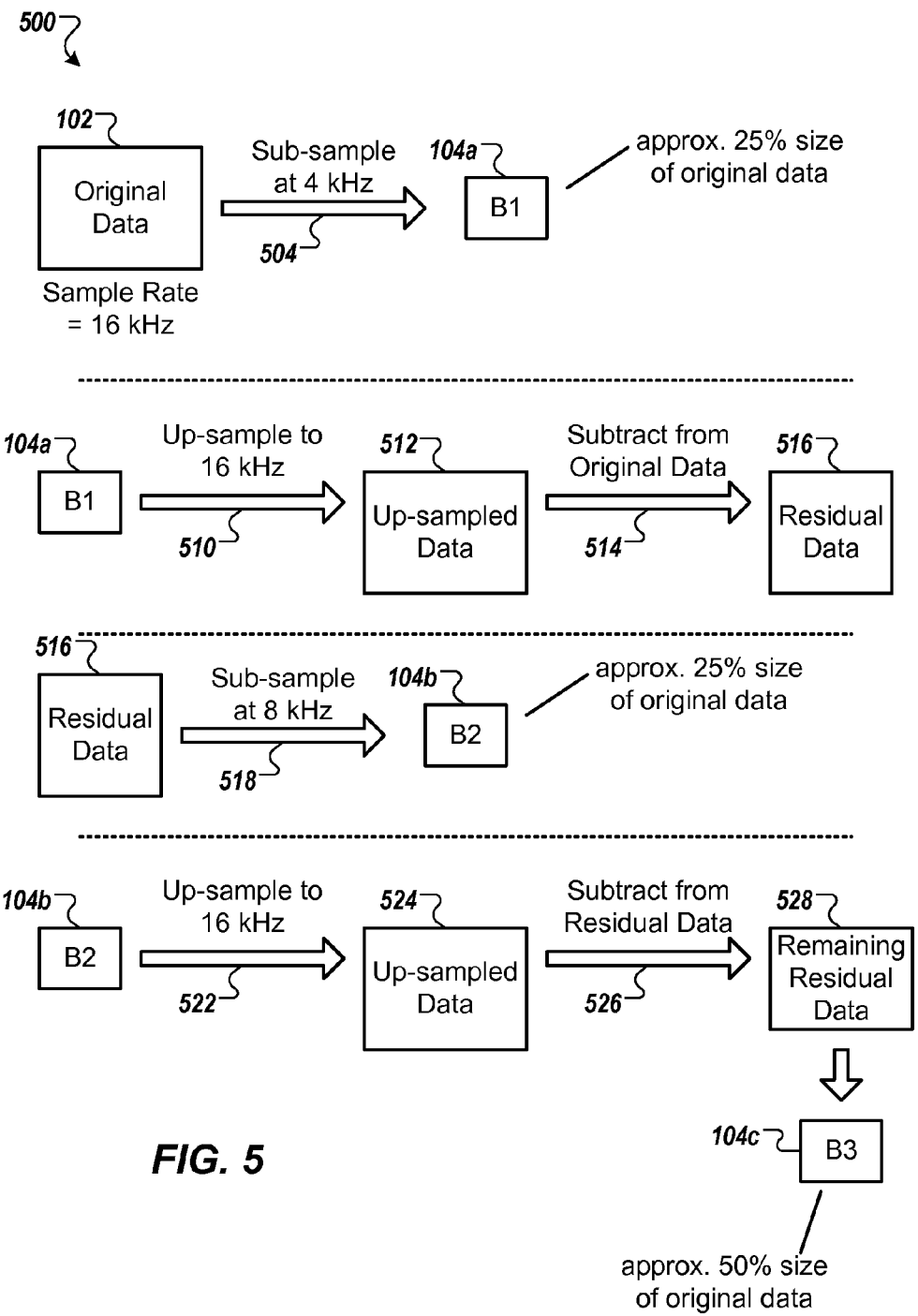
FIG. 5 is a block diagram showing exemplary sample rate encoding.

FIG. 5 is a block diagram showing exemplary sample rate encoding 500. For example, referring to FIG. 1B, the first computing device 152 can perform the exemplary sample rate encoding 500.

Referring to FIGS. 1A, 1B, 4 and 5, the process 400 begins by determining the sample rate of the original data (402). For example, the first computing device 152 determines that the sample rate of the original audio input stream 102 is 16 kHz. In general, and to account for the Nyquist frequency, an audio signal sampled at 16 kHz contains data at frequencies from 0-8 kHz. The process 400 sub-samples the original data at a first fraction of the sample rate (404). The sub-sampled rate for the data is less than the original sample rate for the data. In some implementations, the first computing device 152 determines the fraction of the sample rate based on the number of sub-samples of the original data needed to reproduce all of the original data. In addition, the first computing device 152 can select the fraction of the sample rate such that the resultant sub-sample rate is a multiple of the original sample rate for the audio input stream. For example, the first fraction is ¼ and the original sample rate for the audio input stream 102 is 16 kHz. The first computing device 152 sub-samples (down-samples) the audio input stream 102 at one-quarter of the sample rate of the original data (sub-sample at 4 kHz (504)) obtaining one-quarter of the original audio input stream 102 (the data in the audio input stream at 2 kHz or less in the original 16 kHz audio input stream 102; i.e., ¼ of the 8 kHz Nyquist frequency). This results in the approximate size of the sub-sampled data being 25% of the size of the original data. In some implementations, the sub-sampling process can involve the use of a down-sampling anti-aliasing filter to eliminate artifacts from occurring in the sub-sampled audio signal.

The process 400 generates an initial data block based on the sub-sampled data (406). For example, the first computing device 152 generates data block 104a that includes the encoded sub-sampled data (data sampled at 4 kHz from the original 16 kHz audio input stream 102). This results in the size of the data block 104a being approximately 25% of the size of the original data. The process 400 compresses the initial data block (408). In some implementations, the first computing device 152 can compress the data in the data block 104a using one of many available lossless data compression techniques. The lossless data compression techniques can include but are not limited to Huffman coding, Rice coding, free lossless audio codec (FLAG), and linear prediction (or linear predictive coding (LPC)). In some implementations, the first computing device 152 may digitally represent the uncompressed data using raw pulse-code modulation (PCM) (e.g., a sequence of numbers). The process 400 transmits the initial data block (410). For example, the first computing device 152 transmits data block 104a to the second computing device 156 using the network 154.

The process 400 up-samples the initial data block from the first fraction of the sample rate to the original sample rate to generate initial up-sampled data at the original sample rate (412). For example, the first computing device 152 decompresses the data in data block 104a and up-samples the data from 4 kHz to 16 kHz (510) producing initial up-sampled data 512 at a 16 kHz rate that includes data in only one-quarter of the signal (data at 2 kHz or less). The initial up-sampled data 512 is subtracted from the original data (514) to produce a first low entropy residual signal that includes first residual data 516 at the frequency rate of the original audio input stream (414). For example, the first computing device 152 subtracts the initial up-sampled data 512 (the up-sampled signal at 16 kHz that includes data in only one-quarter of the signal (data at 2 kHz and below)) from the original audio input stream 102 with a sampling rate of 16 kHz. The resultant first low entropy residual signal includes first residual data 516 in three-quarters of the 16 kHz signal (data at frequencies between 2 kHz and 8 kHz).

The process 400 sub-samples the first residual data at a second fraction of the sample rate (416). The first computing device 152 can select the second fraction of the sample rate to provide additional data for the original audio input stream not provided by the sub-sampling of the original audio input stream at the first fraction of the sample rate. For example, the second fraction is ½ and the original sample rate for the audio input stream 102 is 16 kHz. The first computing device 152 sub-samples the first residual data at one-half of the sample rate of the original data (sub-sample at 8 kHz (518)) obtaining one-half of the first residual data (data at 4 kHz or below; i.e., ½ of the 8 kHz Nyquist frequency of the original audio input stream). The obtained one-half of the first residual data includes one-quarter of the data from the original audio input stream 102 (the data in the audio input stream from 2 kHz to 4 kHz as the data at 2 kHz and below was subtracted from the original audio input stream 102 to produce the first low entropy residual data.) This results in the approximate size of the sub-sampled data being 25% of the size of the original data. In some implementations, the sub-sampling process can involve the use of a down-sampling anti-aliasing filter to eliminate artifacts from occurring in the sub-sampled audio signal.

The process 400 generates an intermediate data block based on the sub-sampled first residual data (418). For example, the first computing device 152 generates data block 104b that includes the encoded sub-sampled first residual data (data sampled at 4 kHz from the original 16 kHz audio input stream 102 that includes data from 2 kHz to 4 kHz). This results in the size of the data block 104a being approximately 25% of the size of the original data. The process 400 compresses the intermediate data block (420) using any of the previously described lossless data compression techniques. In some implementations, the first computing device may digitally represent the uncompressed data using raw PCM. The process 400 transmits the intermediate data block (422). For example, the first computing device 152 transmits data block 104b to the second computing device 156 using the network 154.

The process 400 up-samples the intermediate data block from the second fraction of the sample rate to the original sample rate to generate intermediate up-sampled data at the original sample rate (424). For example, the first computing device 152 decompresses the data in data block 104b and up-samples the data in the data block 104b from 8 kHz to 16 kHz (522) producing intermediate up-sampled data 524 at a 16 kHz rate that includes data in only one-quarter of the signal (data from 2 kHz to 4 kHz). The intermediate up-sampled data 524 is subtracted from the first residual data (526) to produce a second low entropy residual signal that includes remaining residual data 528 at the frequency rate of the original audio input stream (426). For example, the first computing device 152 subtracts the intermediate up-sampled data 524 (the up-sampled signal at 16 kHz that includes data in only one-quarter of the signal (data between 2 kHz and 4 kHz)) from the first residual data 526 (a data signal at 16 kHz that includes residual data above 2 kHz) resulting in remaining residual data 528. The remaining residual data 528 is included in a data signal at 16 kHz, where the residual data is in the signal at frequencies above 4 kHz.

The process 400 generates a final data block based on the remaining residual data (428). For example, the first computing device 152 generates data block 104c that includes the remaining residual data 528. This results in the size of the data block 104c being approximately 50% of the size of the original data. The process 400 compresses the final data block (430). In some implementations, the first computing device 152 can compress the data in the data block 104c using one of many available lossless data compression techniques previously described. In some implementations, the first computing device may digitally represent the uncompressed data using raw PCM. The process 400 transmits the final data block (432). For example, the first computing device 152 transmits data block 104c to the second computing device 156 using the network 154. The process 400 ends.

In some implementations, the first computing device 152 can compress the sub-sampled data included in the data blocks using a lossy compression technique (e.g., Joint Photographic Experts Group (JPEG) compression). The lossy compression technique selected should preserve the phase information of the original audio input stream data. Preserving the phase information of the data can prevent the residual data signal (generated by subtracting the up-sampled data (up-sampled from the sub-sampled data) from the original data) from having a large magnitude and high entropy. A lossy compression technique can be used for compressing the sub-sampled data without the loss of any of the original audio input stream data due to the computation and transmission of residual data. For example, referring to FIG. 4, the process 400 can compress a data block using a lossy compression technique. The data block prior to compression includes data from the original audio input stream at and below a particular frequency. When compressing the data block data using a lossy compression technique, some of the data in the original audio input stream at and below the selected frequency may be lost (not included) in the compression. The process 400 further decompresses and up-samples the data block to the original sample rate to generate up-sampled data. The up-sampled data will include only the data previously compressed and none of the lost data. The up-sampled data is then subtracted from the original audio input stream data resulting in residual data that includes data above the selected frequency and the data at and below the selected frequency that was lost in the previous compression. The lost data can then be included in the next data block, which may or may not be compressed. For example, referring to FIG. 5, the initial data block 104a and the intermediate data block 104b can be compressed using a lossy compression technique. Any data lost by the lossy compressions can be present in the remaining residual data 528 that can be transmitted uncompressed or compressed using a lossless compression technique before transmission. The lossless compression of the remaining residual data or not compressing the remaining residual data can ensure the transmission of any data lost from previous lossy compression techniques for previously transmitted data blocks.

Referring to the example process 400 in FIG. 4 and referring to FIG. 1B, the first computing device 152 generates and transmits the encoded audio input stream using three data blocks. Other implementations of the process 400 may generate and transmit a different number of data blocks. The number of data blocks generated can depend on one or more factors that can include but are limited to the sampling rate of the original audio input stream, the selected sub-sampling rate of the original audio input stream, the bandwidth of the network connection between the transmitting device and the receiving device, and the latency time required for receipt of the results of the audio input stream. In some implementations, the transmitted data blocks can be a combination of compressed and uncompressed data blocks where the compression techniques can be a combination of lossy and lossless techniques.

Figure 6:
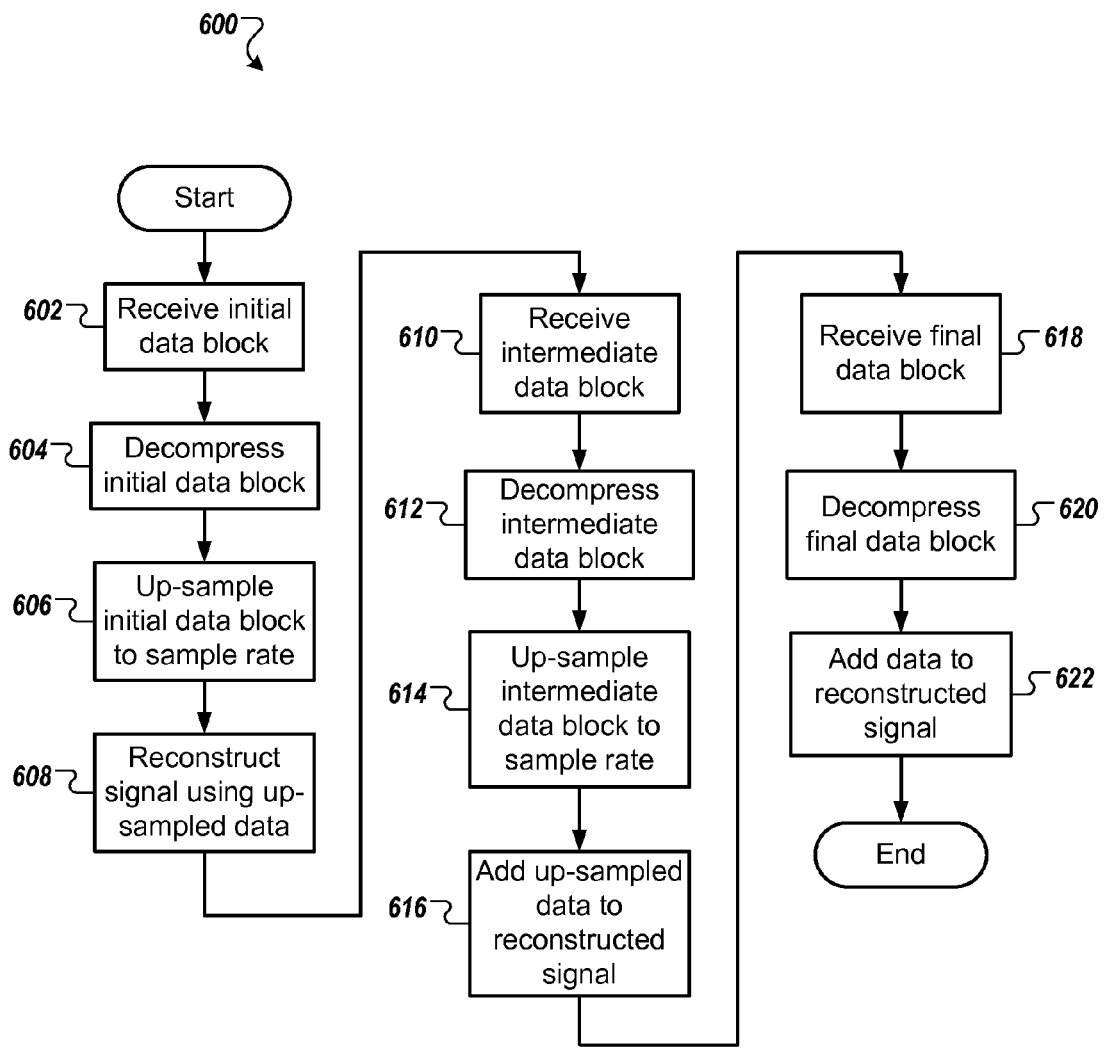
FIG. 6 is a flowchart of an exemplary audio decoding process using a sample rate with linear interpolation.

FIG. 6 is a flowchart of an exemplary audio decoding process 600 using a sample rate with linear interpolation. For example, referring to FIGS. 1A and 1B, the second computing device 156 can perform the process 600 in order to receive the data blocks 104, decode the data blocks 104, and reconstruct the input audio stream 102.

Referring to FIGS. 1A, 1B, 4 and 6, the process 600 begins by receiving the initial data block (602). The initial data block can include sub-sampled data. For example, the first computing device 152 transmits data block 104a using the network 154 to the second computing device 156. The process 600 decompresses the initial data block (604). For example, as previously described, the first computing device 152 can compress the data in the data block 104a using one of many available lossy or lossless data compression techniques. In some implementations, the first computing device 152 may not compress the data in the data block 104a. The second computing device 156 can decompress the data block 104a. The process 600 then up-samples the decompressed data of the initial data block from the first fraction of the sample rate to the original sample rate (606). For example, the second computing device 156 up-samples the data in the data block 104a from the 4 kHz sub-sampling rate to the 16 kHz original sample rate producing initial up-sampled data at a 16 kHz rate that includes data in only one-quarter of the signal (data at 2 kHz or less). The initial up-sampled data at the original sample rate is used as the initial reconstructed signal (608). The initial reconstructed signal can be a low sample rate version of the original audio input stream.

The process 600 receives the intermediate data block (610). The intermediate data block can include sub-sampled data. For example, the first computing device 152 transmits data block 104b using the network 154 to the second computing device 156. The process 600 decompresses the intermediate data block (612). For example, as previously described, the first computing device 152 can compress the data in the data block 104b using one of many available lossy or lossless data compression techniques. In some implementations, the first computing device 152 may not compress the data in the data block 104b. The second computing device 156 can decompress the data block 104b. The process 600 then up-samples the decompressed data of the intermediate data block from the second fraction of the sample rate to the original sample rate (614). For example, the second computing device 156 up-samples the data in the data block 104b from the 8 kHz sub-sampling rate to the 16 kHz original sample rate producing intermediate up-sampled data at a 16 kHz rate that includes data in only one-quarter of the signal (data from 2 kHz to 4 kHz) as the intermediate data block is a sub-sample of the first residual data. In some implementations, when lossy compression techniques are used, data may be included at frequencies below 2 kHz. The process 600 adds the intermediate up-sampled data to the initial reconstructed signal to produce an intermediate reconstructed signal (616). The intermediate reconstructed signal can be an intermediate sample rate version of the original audio input stream. For example, the intermediate reconstructed signal includes data at frequencies of 8 kHz and below from the original 16 kHz audio input stream 102 (effectively half of the original audio input stream).

The process 600 receives the final data block (618). The final data block can include the remaining residual data not included in previous data blocks. For example, the first computing device 152 transmits data block 104c using the network 154 to the second computing device 156. The process 600 decompresses the final data block (620). For example, as previously described, the first computing device 152 can compress the data in the data block 104c using one of many available lossy or lossless data compression techniques. In some implementations, the first computing device 152 may not compress the data in the data block 104c. The second computing device 156 can decompress the data block 104c. The process 600 adds the decompressed residual data from the final data block to the intermediate reconstructed signal to produce a final reconstructed signal (622). The final reconstructed signal represents the original audio input stream 102. The process 600 ends.

Figure 7:
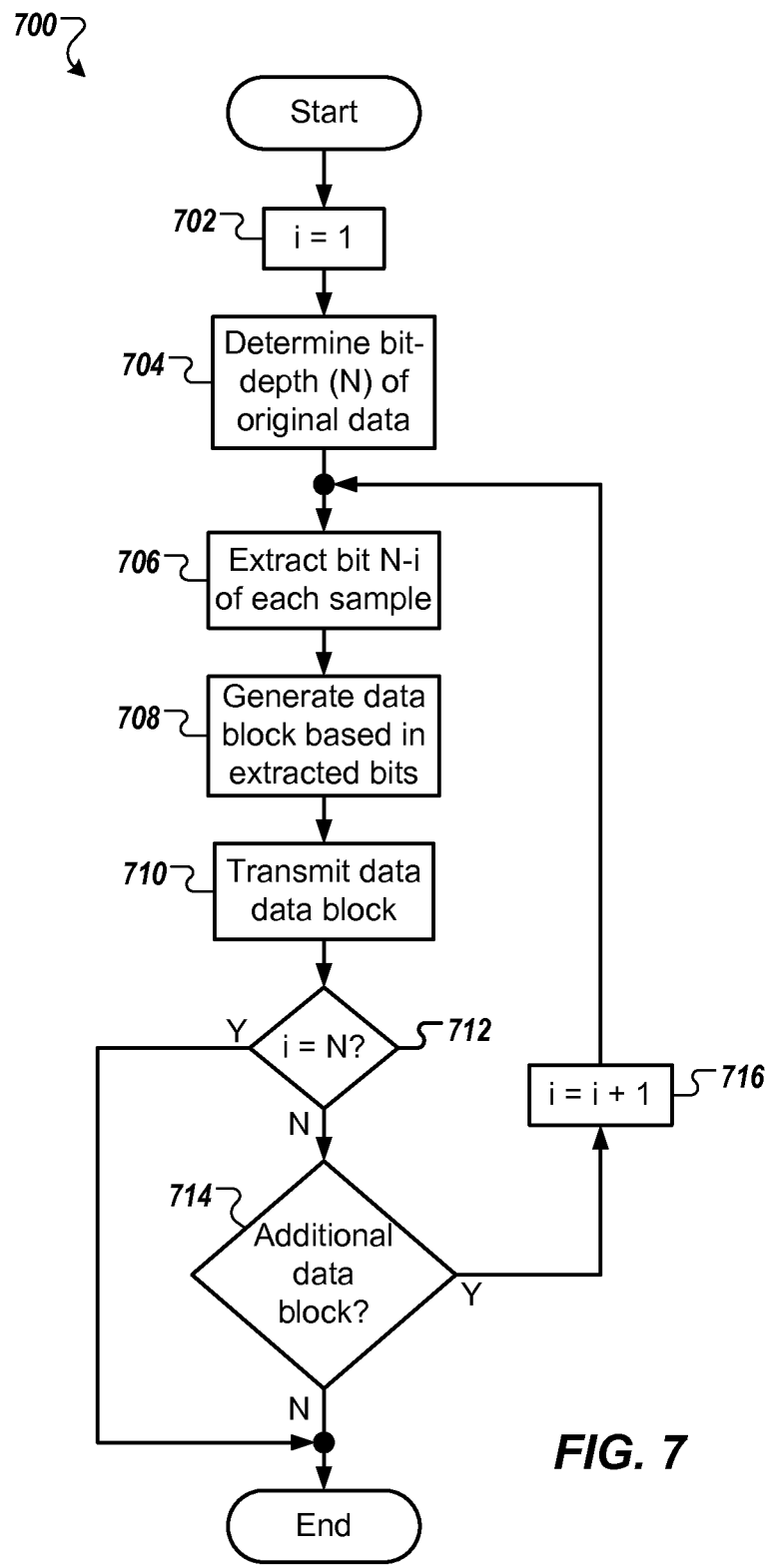
FIG. 7 is a flowchart of an exemplary audio encoding process using bit depth.

FIG. 7 is a flowchart of an exemplary audio encoding process 700 using bit depth. For example, and referring to FIGS. 1A and 1B, the first computing device 152 can perform the process 400 in order to encode the input audio stream 102, generate the data blocks 104, and transmit the data blocks 104. The first computing device 152 can digitally record the input audio stream 102 resulting in multiple samples each having a specific bit depth representing the set of digital audio data for the audio input stream. The bit depth for each sample describes the number of bits of information recorded for each sample and directly corresponds to the resolution of each sample in the set of digital audio data.

Referring to FIGS. 1A, 1B and 7, the process 700 begins by setting an index i equal to one (702). The process 700 determines the bit depth N of the original data (704). For example, the process 700 determines the bit depth of the set of digital audio data for the audio input stream. The digital audio data comprises a series of samples where each sample is N bits. In some implementations, the first computing device 152 can digitize and encode the audio input stream 102 using an N bit linear PCM encoding technique. The process 700 extracts bit N−i of each sample (706). For example, when index i equals one, the process 700 extracts the most significant bit of each N bit sample. The process 700 generates a data block that includes the extracted bit for each N bit sample (708). The process 700 transmits the data block (710). For example, the first computing device 152 can transmit the data block (e.g., data block 104a) using network 154 to the second computing device 156. If the index i is not equal to the bit depth N (712), bits of each N bit sample remain to be extracted and transmitted in a data block to the second computing device 156 by the process 700. The process 700 determines if an additional data block should be generated and transmitted (714). If it is determined that an additional data block should be generated and transmitted, the process 700 increments the index i by one (716). The process then continues at 706. If it is determined that an additional data block should not be generated and transmitted (714), the process 700 ends. If the index i is equal to the bit depth N (712), all bits of each N bit sample have been extracted and transmitted in a data block to the second computing device 156 by the process 700. The process 700 ends.

In some implementations, the process 700 may determine that there is no longer a need to generate and transmit any further data blocks (714). For example, the second computing device 156 can inform the first computing device 152 that a voice recognition application has recognized the input audio stream from the data included in the data blocks already received by the second computing device 156 and no further data blocks are required in order to perform the voice recognition.

The process 700 encodes each block of data for the set of digital audio data for the audio input stream beginning with the most significant bit (N−1) of each N bit sample comprising the first block of data, the next most significant bit (N−2) of each N bit sample comprising the second block of data, proceeding until the last block of data comprised of the least significant bit (N−N=0) of each N bit sample. The process 700 can encode the data blocks directly as raw bits of data. The size of each data block is $1/N^{th}$ the size of the original set of digital audio data for the audio input stream.

In some implementations, the audio input stream signal exhibits more energy (has more data present) at the lower frequency components of the signal as compared to the higher frequency components of the signal. As the frequency of the signal for the audio input stream increases, the numerical value for the digital representation of the signal for the sample also increases. Stated another way, higher frequency information is represented by a larger N bit value. As such, the exemplary audio encoding process 700 can include digital data in the first few data blocks (where higher frequency components of the audio input stream signal are represented in the first few most significant bits of each N bit sample) that can consist of long runs of "0"s or "1"s.

In some implementations, the audio input stream signal has a maximum amplitude that is lower than the recording equipment is capable of detecting. In this case, the digital representation of the audio input stream signal can include bits that may always be equal to zero, as the signal for those bits is undetected. In addition, a linear sixteen-bit encoding technique used for the digitization of the audio input stream signal can be chosen appropriately to avoid sign alternation. The choice of this particular type of linear sixteen-bit encoding can also contribute to the number of bits of the digitized audio input stream that may always be equal to zero.

In some of the implementations described, the digital data included in a data block can consist of long runs of "0"s or "1"s or may include bits that are always equal to zero. In these cases, the use of run length encoding for the digital data included in a data block can further reduce the size of the data block. For example, a reduced data block size can utilize less memory space on both the first computing device 152 and the second computing device 156. In addition, the first computing device 152 transmits less data to the second computing device 156 resulting in reduced latency.

In some implementations, the transmitter (e.g., first computing device 152) can digitize and encode the audio input stream signal using a logarithmic encoding technique (e.g., a u-law algorithm). The use of a logarithmic encoding technique can reduce the dynamic range of the audio input stream signal. In general, the use of a logarithmic encoding technique may require fewer bits in order to represent the audio input stream signal resulting in fewer bits transmitted from the transmitter (e.g., first computing device 152) to the receiver (e.g., second computing device 156) while maintaining similar fidelity as compared to the original audio input stream signal.

Figure 8:
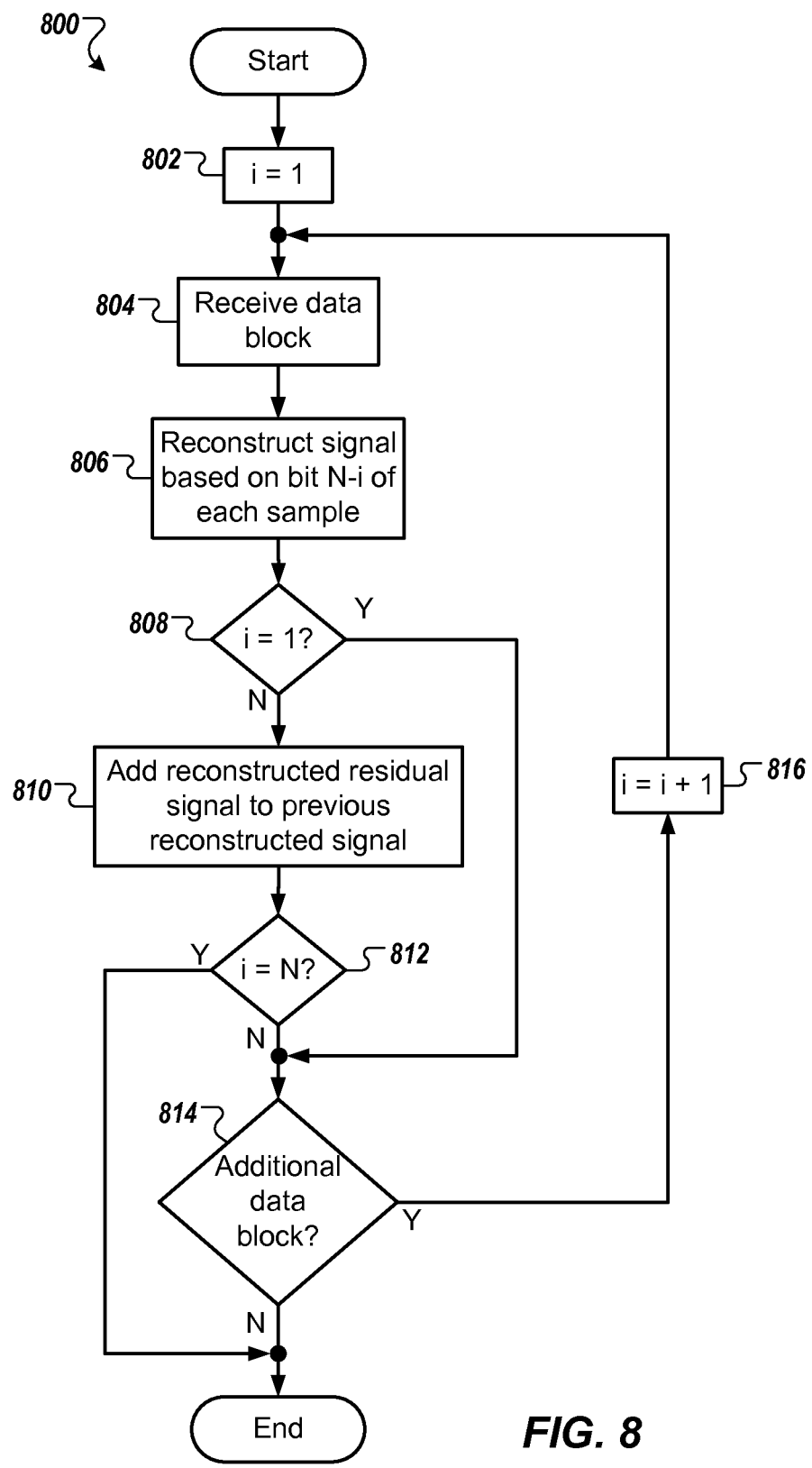
FIG. 8 is a flowchart of an exemplary audio decoding process using bit depth.

FIG. 8 is a flowchart of an exemplary audio decoding process 800 using bit depth. For example, and referring to FIGS. 1A and 1B, the second computing device 156 can perform the process 800 in order to receive the data blocks 104, decode the data blocks 104, and reconstruct the input audio stream 102.

Referring to FIGS. 1A, 1B, 7 and 8, the process 800 begins by setting an index i equal to one (802). The data block is received (804). For example, the first computing device 152 uses the process 700 to generate, encode and transmit data block 104a using network 154. The second computing device 156 receives the data block 104a. The process 800 reconstructs the residual data signal based on bit N−i of each sample included in the data block (806). For example, the bit depth of the original data is equal to N. When the index i is equal to one, the data in the data block 104a is the most significant bit of each N bit sample. The process 800 reconstructs a first residual data signal based on the most significant bit of each N bit sample included in data block 104a. If the index i is equal to one (808), the process 800 checks if there are additional data blocks for receipt (814). If it is determined that an additional data block is not available for receipt (814), the process 800 ends. If it is determined that an additional data block is available for receipt (814), the process 800 increments the index i by one (816). For example, the index i is now equal to two. The process 800 then continues and receives the next data block (804). The process 800 reconstructs the residual data signal based on bit N−i of each sample included in the data block (806). For example, the first computing device 152 transmits data block 104b that includes the N−2 bit (where the most significant bit is the N−1 bit) of each N bit sample. The process 800 receives data block 104b. The process 800 reconstructs a second residual data signal based on the N−2 bit of each N bit sample included in data block 104b. The index i is not equal to one (808). The process 800 adds the reconstructed residual data signal to the previous reconstructed data signal (810). The result is an updated reconstructed data signal that includes residual data based on the bit depth of the original input audio stream. For example, the process 800 adds the second reconstructed data signal to the first reconstructed data signal producing an updated reconstructed signal that is of a higher fidelity than the previous reconstructed signal as it includes an additional bit of data for each N bit sample. The process 800 checks if the index i is equal to the number of bits N in each sample (812). If the index i is not equal to the number of bits N in each sample, the process 800 checks if there are additional data blocks for receipt (814). If it is determined that an additional data block is available for receipt (814), the process 800 increments the index i by one (816). The process continues to receive the next data block (804). If it is determined an additional data block is not available for receipt (814), the process 800 ends. If the index i is equal to the number of bits N in each sample (812), the process 800 ends.

The processes 700 and 800 can be considered in the context of an audio signal transmission framework that produces progressively higher fidelity residual signals. A receiver (e.g., second computing device 156 in FIG. 1B) receives residual signals generated and transmitted by a transmitter (e.g., first computing device 152). The receiver uses the residual signals to reconstruct a progressively higher fidelity signal. For example, the process 700 first generates and transmits the first data block, which includes data for the most significant bit of each N bit sample at a base residual signal fidelity. The process 800 receives the first data block and reconstructs the base residual signal. The next data block transmitted includes the data for the next most significant bit (N−2) of each N bit sample. The receiver reconstructs the residual signal and adds it to the base signal, generating a higher fidelity residual signal. The receiver generates and transmits each of the subsequent data blocks sequentially. The receiver receives the data blocks and sequentially reconstructs the audio input stream by adding each data block in sequence producing a progressively higher fidelity signal as each data block is added to the previously reconstructed signal. The receiver reconstructs each N bit sample of the audio input stream signal on a bit by bit basis, from the most significant bit to the least significant bit, resulting in a progressively higher fidelity reconstructed signal.

In some implementations, an audio signal transmission framework can combine the audio encoding process 400 using a sample rate with linear interpolation with the audio encoding process 700 using bit depth. A transmitter can generate a first data block that has a low sample rate and bit depth. For example, referring to FIGS. 1A and 1B, first computing device 152 can determine the sample rate of the original audio input stream 102 is 16 kHz. The first computing device 152 can sub-sample the audio input at a fraction of the sample rate (¼ of the sample rate resulting in a 4 kHz sub-sample rate). The first computing device 152 can determine the bit depth N of the original audio input stream 102. The first computing device 152 can extract the most significant bit (the N−1 bit) for each N bit sample in the sub-sampled data to generate a residual data signal in data block 104a where the first computing device 152 can additionally compress the data in the data block 104a. The transmitter can generate a subsequent data block at the sub-sample rate that can increase the bit depth of the reconstructed residual data signal generated by the receiver. For example, the first computing device 152 generates, compresses and transmits the N−2 bit of each N bit sample at the 4 kHz sub-sample rate. Alternatively, the transmitter can generate a subsequent data block at a higher sub-sample rate and the same bit depth that can increase the sample rate of the reconstructed residual data signal generated by the receiver. For example, the first computing device 152 generates, compresses and transmits the most significant bit (the N−1 bit) of each N bit sample at an 8 kHz sub-sample rate. The transmitter can alternate between transmitting data blocks that can either increase the bit depth of the reconstructed residual data signal or increase the sample rate of the reconstructed residual data signal until the sample rate and bit depth of the reconstructed data signal equal the sample rate and bit depth of the original audio input stream. The transmitter can pre-determine the order in which to increase the sample rate and bit depths in order to maximize the incremental recognition accuracy achieved by each residual data signal produced by the receiver using each successive block of compressed residual data transmitted. In some implementations, the order in which the blocks are transmitted can be based on a priority level assigned to each block.

Figure 9:
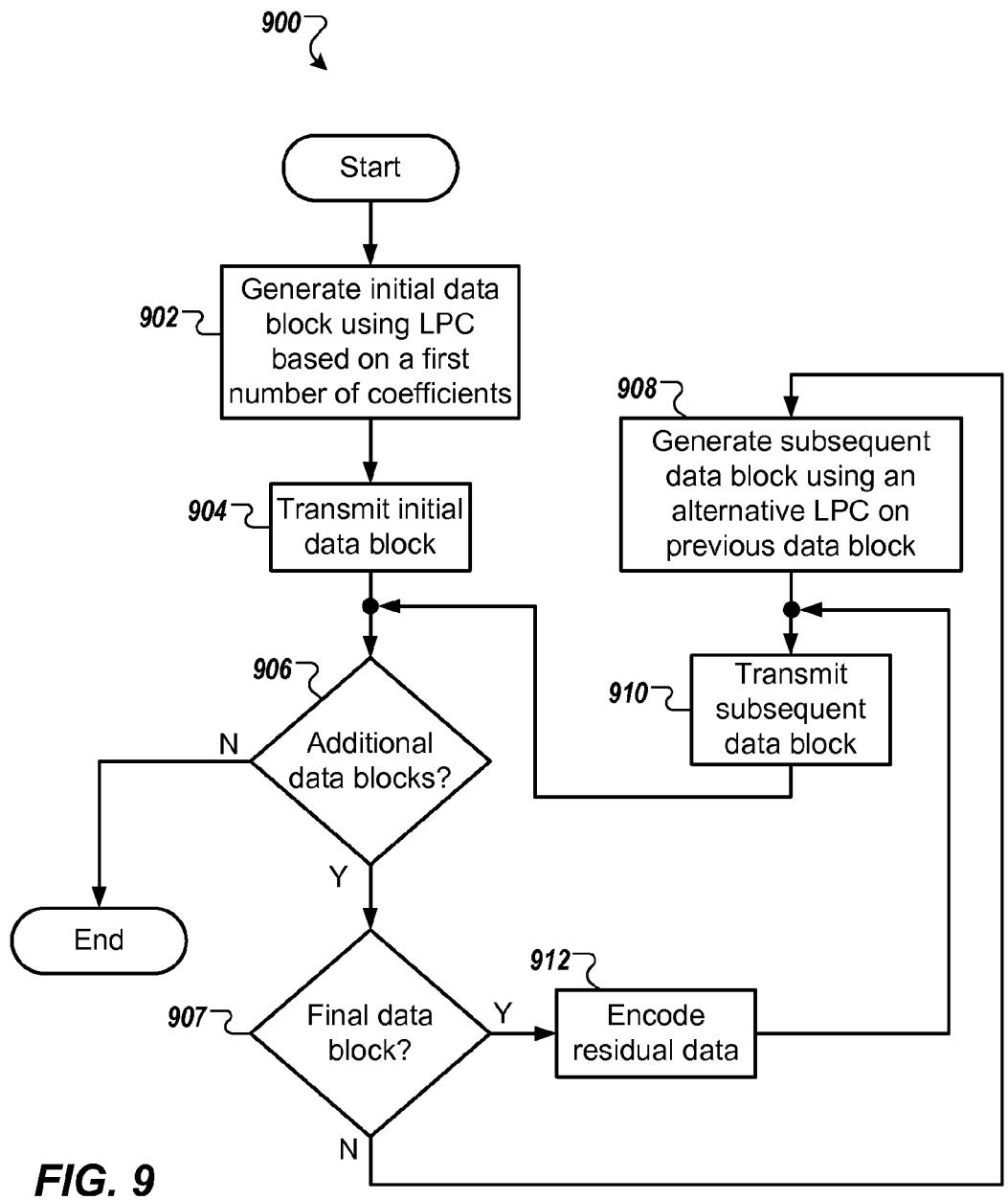
FIG. 9 is a flowchart of an exemplary audio encoding process using linear predictive coding.

FIG. 9 is a flowchart of an exemplary audio encoding process 900 using linear predictive coding (LPC). LPC represents the spectral envelope of digital audio data in a compressed format using a linear predictive model. The linear predictive model uses a linear function (a predictor) that includes one or more previous values of a time series signal and one or more estimated predictor coefficients to predict (estimate) the next value of the time series signal. The predicted next value of the time series signal is the output of the predictor. An error term associated with the output forms another time series signal called the error residual. The complexity of the predictor can vary based on the amount of time it looks back in the input audio signal (the number of previous values of the time series signal used), the number of predictor coefficients used, and the complexity of the predictor coefficients. For example, a higher order predictor can use a higher order polynomial or other non-linear method.

The process 900 can use LPC to encode an initial block of digital audio data generated from the original audio input stream. For the initial encoded block of data, the process 900 can transmit information that describes the predictor (e.g., the set of predictor coefficients) used in the LPC of the original audio signal and a residual signal. The residual signal is the difference between the output of the predictor and the original audio input stream.

A first data block generated by the process 900 provides a first pass encoding of the audio input stream using a base LPC encoding technique. In some implementations, the process 900 can use alternative LPC encoding techniques to encode the residual data from the previous data blocks to generate subsequent data blocks. The predictor for the alternative LPC encoding technique can be more complex as compared to the predictor for the base LPC encoding technique. For example, an alternative LPC encoding technique can use a larger number of predictor coefficients (e.g., a longer prediction filter) than the base LPC encoding technique. For example, the alternative LPC encoding technique can implement a higher order predictor that uses a higher degree time series expansion of the audio input stream using, for example, higher order polynomials and other additional non-linear mappings. The process 900 can use progressively higher order predictors in the alternative LPC technique used to generate each subsequent data block to encode the residual data of the previous data block as each data block progressively decreases in size.

For example, and referring to FIGS. 1A, 1B and 9, the first computing device 152 can perform the process 900 in order to encode the input audio stream 102, generate the data blocks 104, and transmit the data blocks 104. The process 900 begins by generating an initial data block using an initial LPC technique based on a first number of predictor coefficients (902). For example, the first computing device 152 generates data block 104a using the initial LPC technique on the audio input stream 102. The initial LPC technique uses two predictor coefficients (looks back two samples into the audio input stream 102). The data block 104a includes the two predictor coefficients used in the LPC of the audio input stream 102 and an initial residual data signal. The initial residual data signal is the difference between the output of the predictor used in the initial LPC and the audio input stream 102.

The process 900 transmits the initial data block (904). For example, the first computing device 152 transmits data block 104a to the second computing device 156 using the network 154. The process 900 determines if an additional data block can be generated and transmitted (906). If it is determined that an additional data block should not be generated and transmitted (906), the process 900 ends. If it is determined that an additional data block can be generated and transmitted (906), the process 900 continues at 907. If it is determined that the current data block is not the final data block (907), the process 900 continues at 908. The process 900 generates a subsequent data block using an alternative LPC technique on the data in the previous data block (908). The alternative LPC technique uses a larger number of predictor coefficients than the initial LPC technique. For example, the first computing device 152 generates data block 104b using an alternative LPC technique on the initial residual data signal included in the previous data block 104a. The alternative LPC technique uses four predictor coefficients (looks back four samples into the residual data of data block 104a). The data block 104b includes the four predictor coefficients used in the LPC of the initial residual data signal and a second residual data signal. The second residual data signal is the difference between the output of the predictor used in the alternative LPC and the original audio input stream 102. The process 900 transmits the subsequent data block (910).

If it is determined that the current data block is the final data block (907), the process 900 continues at 912 where the residual data is encoded. For example, the final data block includes the raw remaining residual data without the use of LPC. The first computing device 152 can determine the remaining residual data signal by subtracting the residual data signal from each of the previous data blocks from the original audio input stream 102 resulting in the remaining residual data. In some implementations, the final data block can be compressed using one of the lossless compression encoding schemes previously described (e.g., a Huffman encoding or Rice encoding). The process 900 transmits the subsequent (in this case the final) data block (910). If it is determined that there are no additional data blocks (906), the process 900 ends.

In some implementations, the first computing device 152 can base the determination for generation of additional data blocks (906) on the receipt of a request for an additional data block from the second computing device 156. For example, if a voice recognition application on the second computing device 156 can recognize the input audio stream prior to the first computing device 152 transmitting all of the possible data blocks, the second computing device 156 can instruct the first computing device 152 not to transmit subsequent data blocks. In some implementations, the first computing device 152 can base the determination for generation of additional data blocks (906) on a timer. If the set time for the timer has expired, the process 900 may no longer generate and transmit additional data blocks.

Figure 10:
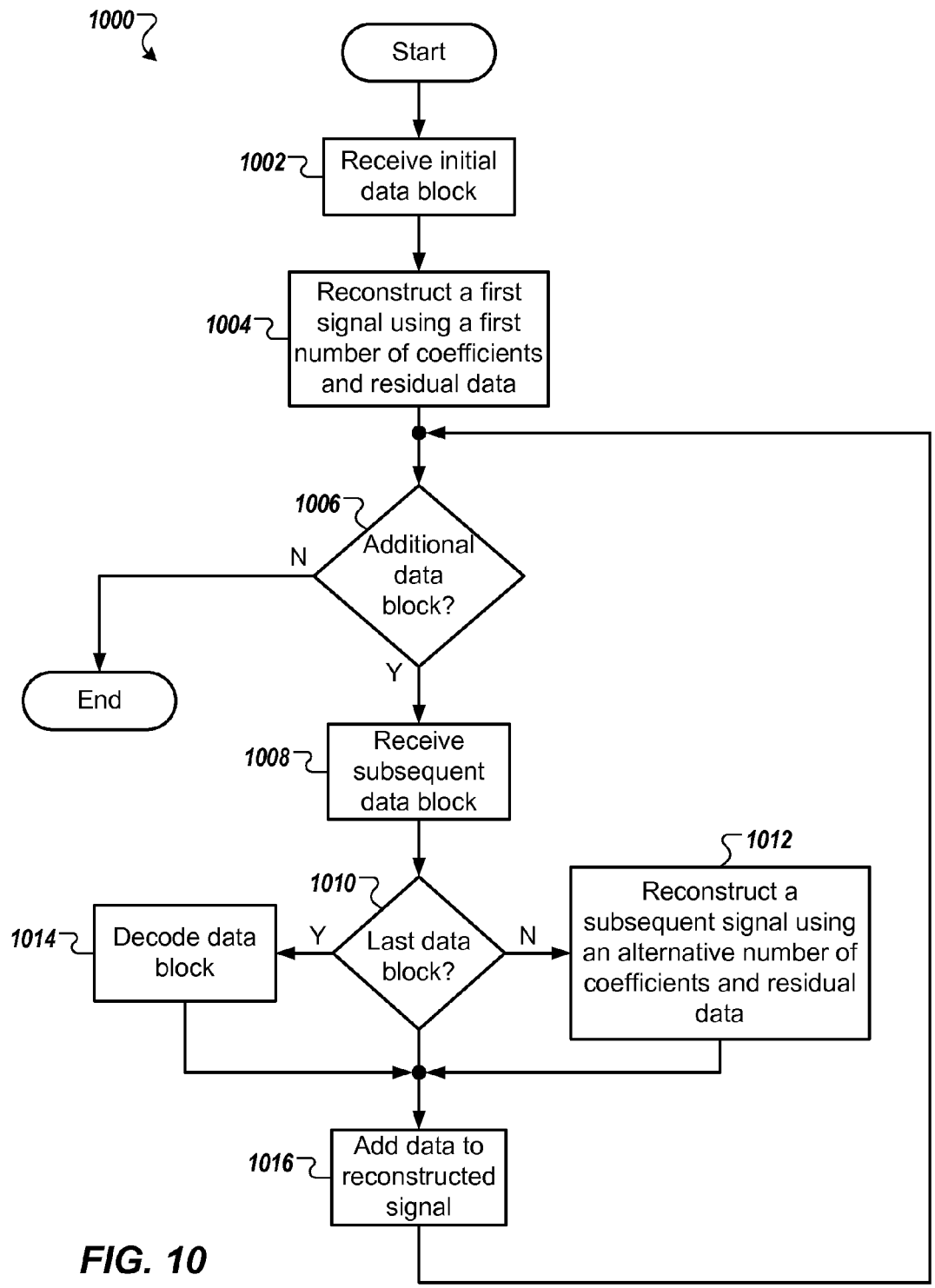
FIG. 10 is a flowchart of an exemplary audio decoding process using linear predictive coding.

FIG. 10 is a flowchart of an exemplary audio decoding process 1000 using linear predictive coding. For example, referring to FIGS. 1A and 1B, the second computing device 156 can perform the process 1000 in order to receive the data blocks 104, decode the data blocks 104, and reconstruct the input audio stream 102.

Referring to FIGS. 1A, 1B, 9 and 10, the process 1000 begins by receiving an initial data block (1002). The initial data block includes the predictor coefficients (a first number of coefficients) used by the initial LPC technique in the process 900. For example, data block 104a includes the two predictor coefficients used by the initial LPC technique. The process 1000 begins reconstructing a first data signal using the first number of predictor coefficients (1004). The resultant reconstructed signal is the base reconstructed signal. For example, the process 1000 reconstructs the first data signal using the two coefficients in the data block 104a. The process 1000 determines if there are additional data blocks for receipt (1006). If it is determined that an additional data block is not available for receipt (1006), the process 1000 ends. If it is determined that an additional data block is available for receipt (1006), the process 1000 receives a subsequent data block (1008). For example, the first computing device 152 transmits the data block 104b using network 154. The second computing device 156 receives the subsequent data block 104b. The second data block 104b includes the initial residual data signal, which is the difference between the output of the initial LPC predictor and the audio input stream 102. If it is determined that this is not the final data block (1010), the process 1000 reconstructs a subsequent signal using an alternative number of predictor coefficients and residual data (1012). The subsequent data block includes the predictor coefficients (an alternative number of coefficients) used by the alternative LPC technique in the process 900 and a subsequent residual data signal. For example, data block 104c includes the four predictor coefficients used by the alternative LPC technique. In addition, the data block 104c includes the second residual data signal, which is the difference between the output of the predictor used in the alternative LPC and the original audio input stream 102. The process 1000 reconstructs a subsequent data signal using the four predictor coefficients and the second residual data signal. The process 1000 adds the reconstructed subsequent data signal to the base reconstructed signal (1016). The addition of the reconstructed subsequent data signal to the base reconstructed signal results in the updating of the base reconstructed signal. The process 1000 determines whether there are additional data blocks for receipt (1006).

The process 1000 receives a subsequent data block (1008). If it is determined that this is the final data block (1010), the process 1000 decodes the data block (1014). The final data block is a reconstructed subsequent data block that includes raw residual data. In some implementations, the final data block can include raw residual data that is compressed using a lossless compression technique. The process 1000 in addition can decompress the raw residual data in the final data block prior to decoding the data. The process 1000 adds the reconstructed subsequent data signal to the base reconstructed signal (1016). The addition of the reconstructed subsequent data signal to the base reconstructed signal results in the updating of the base reconstructed signal. The process 1000 at 1006, where it is determined that there are no more additional data blocks. The process 1000 ends.

In some implementations, a transmitter can use perceptual coding techniques that apply lossy audio compression to generate, encode and transmit audio data blocks. For example, the human brain may not process all frequencies of an audio input stream in the same manner. Some frequencies can be compressed or removed entirely from the audio input stream without any adverse effect. The perceptual coding techniques can use a psychoacoustic model to identify those frequencies that can be aggressively compressed or even eliminated from an audio input stream with no perceived difference noted by a listener.

When applied in the context of an audio signal transmission framework that produces progressively higher fidelity residual signals, a perceptual coding technique can aggressively reduce the fidelity of the audio input stream in the first data block. The perceptual coding technique can apply progressively less aggressive encoding of each residual data signal to produce the remaining sequential data blocks.

Existing audio encoding techniques such as code-excited linear prediction (CELP), which can be used as a basis for codecs designed to compress an audio input stream, can also be extended for use in the context of an audio signal transmission framework. For example, audio encoders may use vector quantization to compress various parts of the audio input stream such as the excitation signal or the residual. The audio signal transmission framework can generate sequential data blocks where the parameters that can be varied or augmented with each block can include the resolution of the vector quantization or the size of the codebook.

In some implementations, an audio signal transmission framework can use perceptual coding techniques for compressing the residual signal in the processes described with reference to FIGS. 4, 7, and 9.

In general, the sequential data blocks generated by a transmitter can form a directed acyclic graph or tree. The transmitter can take different paths along the tree as long as the receiver receives all the data blocks needed in order to make use of the currently received data block. For example, the root node is the first (or initial) data block. Each node is labeled with the priority level of its associated data block. For example, an edge points from node A to node B. The edge requires the transmission of node A before node B in order for the receiver to receive the information in block A before the information in block B. The receiver may need the information in node A in order to make use of the information in the received block B. For example, in the progressive encoding techniques described with reference to FIGS. 4, 7, and 9, the tree can be a chain comprising each node in the sequence of data blocks. In some implementations, the transmitter may transmit data blocks that include additional information, such as audio prologue information, if the receiver has already received at least one data block. The dependencies between nodes are expressed as edges in the graph. The transmitter uses an algorithm to determine the order in which to transmit the data blocks. In some implementations, the transmitter can pre-code the algorithm prior to the transmission of the data blocks. In some implementations, the transmitter can construct the tree as it generates and transmits the data blocks. For example, the transmitter can produce a last functional tree where a complete map of the tree is constructed as the data blocks are generated. For example, the transmitter selects the highest priority node (e.g., node B) for which every previous node (e.g., node A) that has an edge from that node (e.g., node A) to the selected node (e.g., node B) has already been transmitted. In most cases, the root of the tree will be the first node to be transmitted as it has no edges pointing to it.

In the processes described with reference to FIGS. 1A, 1B and 2 to 9, a transmitter sends data blocks in sequence to a receiver that reconstructs the audio signal as it receives each block. In addition, the receiver runs a voice recognition process. In some implementations, either the transmitter or receiver can decide that the transmitter has transmitted sufficient data blocks. In some implementations, the receiver can monitor the voice recognition process to determine the value of the recognizer's confidence signal. When the voice recognizer has received sufficient data blocks to recognize the speech in the reconstructed audio input stream with sufficient confidence, the receiver can signal to the transmitter to stop sending further blocks. In addition, the transmitter can transmit the recognition result.

In some implementations, the receiver or transmitter can monitor how much time has elapsed since the user finished speaking. If this time exceeds some pre-set threshold (e.g. 10 seconds), the transmitter can stop transmitting data blocks. In addition, the receiver can transmit the recognition result to the transmitter without regard to the confidence level of the voice recognizer.

In some implementations, a heuristic score can combine the confidence level of the recognizer with a measure of how much time has elapsed since the user finished speaking. When the heuristic score crosses a predetermined threshold level, the transmitter can halt the data block generation and transmission process. In some cases, (e.g., fast networks or in noisy environments) all possible data blocks may be generated and transmitted before this predetermined threshold is reached.

The processes described with reference to FIGS. 1A, 1B and 2 to 9 can be applied to a short segment of speech being transmitted once for use in an application (e.g., a voice search application). In other applications, a user may be dictating a long message (e.g., dictating an electronic mail (email) message). In these applications, the transmitter can break the audio input stream into a sequence of short segments or chunks for the purpose of voice recognition. The transmitter can use a segmenting method (e.g., endpointing or voice activity detection) to segment the audio input stream. In these applications, the processes described with reference to FIGS. 1A, 1B and 2 to 9 can be applied to each segment to generate, transmit, and receive the multiple data blocks per segment. In some implementations, the receiver can determine whether a sufficient number of data blocks are transmitted based on the need to meet real-time transmission criteria. For example, the receiver may signal the transmitter to stop the transmission of the data blocks for one segment of the audio input stream as soon as it is possible to begin transmitting blocks for the next segment of the audio input stream. For example, an audio signal transmission framework can integrate the transmission techniques for long messages into an audiovisual transmission protocol such as RTP (Real-Time Transport Protocol). The receiver can use RTTP control packets to signal when the transmitter should stop sending data blocks. In some implementations, the transmitter needs to keep up with the real time audio input stream as it generates and transmits data blocks to the receiver for each segment of the audio input stream. The transmitter can determine to transmit the remaining data blocks for the current audio input stream segment or to begin transmitting the data blocks for the next audio input stream segment.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the present disclosure can be realized on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementation s are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
one or more computers; and
a computer-readable medium coupled to the one or more computers and having instructions stored thereon which, when executed by the one or more computers, cause the one or more computers to perform operations comprising:
processing a digital audio signal to generate a first sub-set of data, the first sub-set of data defining an entire portion of the digital audio signal;
transmitting the first sub-set of data for generation of a reconstructed audio signal, the reconstructed audio signal being i) a reconstruction of the entire digital audio signal and ii) having a first fidelity relative to a fidelity of the digital audio signal;
receiving a first signal indicating that the first fidelity of the reconstructed audio signal is less than a threshold fidelity;
in response to receiving the first signal, processing the digital audio signal to generate a second sub-set of data, the second sub-set of data comprising data that is different than data of the first sub-set of data;
transmitting the second sub-set of data, wherein the second sub-set of data is useable to obtain an updated reconstructed audio signal, the updated reconstructed audio signal being i) a reconstruction of the entire digital audio signal and ii) having a second fidelity relative to the fidelity of the digital audio signal;
receiving a second signal indicating that the second fidelity of the updated reconstructed audio signal is greater than the threshold fidelity; and
in response to receiving the second signal, ceasing generation of subsequent sub-sets of data based on the digital audio signal.

2. The system of claim 1, wherein the second sub-set of data includes more data than the first sub-set of data.

3. The system of claim 1, the operations further comprising:
in response to receiving the first signal, processing the digital audio signal to generate a third sub-set of data, the third sub-set of data comprising data that is different than data of the first and second sub-sets of data; and
comparing a priority of the second sub-set of data to a priority of the third sub-set of data;
wherein transmitting further comprises transmitting, based on the comparing, only one of the second sub-set of data and the third sub-set of data, wherein the operations further comprise subsequently transmitting the other of the second sub-set of data and the third sub-set of data to obtain a further updated reconstructed audio signal having a third fidelity relative to the fidelity of the digital audio signal, the third fidelity of the third version of the reconstructed audio signal greater than the second fidelity.

4. The system of claim 3, wherein the third sub-set of data includes more data than each of the second sub-set of data and the first sub-set of data.

5. The system of claim 3, wherein processing the digital audio signal to generate a first sub-set of data comprises:
   determining an original sampling rate of the digital audio signal; and
   down-sampling data of the digital audio signal at a first sampling rate that is less than the original sampling rate to provide the first sub-set of data.

6. The system of claim 5, wherein processing the digital audio signal to generate a second sub-set of data comprises:
   up-sampling data of the first sub-set of data at the original sampling rate to provide first up-sampled data;
   subtracting the first up-sampled data from data of the digital audio signal to provide first residual data; and
   down-sampling the first residual data at a second sampling rate that is greater than the first sampling rate and that is less than the original sampling rate to provide the second sub-set of data.

7. The system of claim 6, wherein processing the digital audio signal to generate a third sub-set of data comprises:
   up-sampling data of the second sub-set of data at the original sampling rate to provide second up-sampled data; and
   subtracting the second up-sampled data from the first residual data to provide second residual data, the second residual data defining the third sub-set of data.

8. The system of claim 1, wherein processing the digital audio signal to generate a first sub-set of data comprises:
   determining a bit-depth of data of the digital audio signal; and
   extracting a first bit of each sample of the data of the digital audio signal to provide first extracted data, the first extracted data defining the first sub-set of data and the first bit being determined based on the bit-depth.

9. The system of claim 8, wherein processing the digital audio signal to generate a second sub-set of data comprises extracting a second bit of each sample of the data of the data set to provide second extracted data, the second extracted data defining the second sub-set of data and the second bit being determined based on the bit-depth.

10. The system of claim 3, wherein the operations further comprise compressing the first sub-set of data and the one of the second sub-set of data and the third sub-set of data.

11. A method, comprising:
   processing a digital audio signal to generate a first sub-set of data, the first sub-set of data defining an entire portion of the digital audio signal;
   transmitting the first sub-set of data for generation of a reconstructed audio signal, the reconstructed audio signal being i) a reconstruction of the entire digital audio signal and ii) having a first fidelity relative to a fidelity of the digital audio signal;
   receiving a first signal indicating that the first fidelity of the reconstructed audio signal is less than a threshold fidelity;
   in response to receiving the first signal, processing the digital audio signal to generate a second sub-set of data, the second sub-set of data comprising data that is different than data of the first sub-set of data;
   transmitting the second sub-set of data, wherein the second sub-set of data is useable to obtain an updated reconstructed audio signal, the updated reconstructed audio signal being i) a reconstruction of the entire digital audio signal and ii) having a second fidelity relative to fidelity of the digital audio signal;
   receiving a second signal indicating that the second fidelity of the updated reconstructed audio signal is greater than the threshold fidelity; and
   in response to receiving the second signal, ceasing generation of subsequent sub-sets of data based on the digital audio signal.

12. A non-transitory computer-readable medium coupled to one or more computers and having instructions stored thereon which, when executed by the one or more computers, cause the one or more computers to perform operations comprising:
   processing a digital audio signal to generate a first sub-set of data, the first sub-set of data defining an entire portion of the digital audio signal;
   transmitting the first sub-set of data for generation of a reconstructed audio signal, reconstructed audio signal being i) a reconstruction of the entire digital audio signal and ii) having a first fidelity relative to a fidelity of the digital audio signal;
   receiving a first signal indicating that the first fidelity of the reconstructed audio signal is less than a threshold fidelity;
   in response to receiving the first signal, processing the digital audio signal to generate a second sub-set of data, the second sub-set of data comprising data that is different than data of the first sub-set of data;
   transmitting the second sub-set of data, wherein the second sub-set of data and the third sub-set of data is useable to obtain an updated reconstructed audio signal, the updated reconstructed audio signal being i) a reconstruction of the entire digital audio signal and ii) having a second fidelity relative to the fidelity of the digital audio signal;
   receiving a second signal indicating that the second fidelity of the updated reconstructed audio signal is greater than the threshold fidelity; and
   in response to receiving the second signal, ceasing generation of subsequent sub-sets of data based on the digital audio signal.

13. A system, comprising:
one or more computers; and
a computer-readable medium coupled to the one or more computers and having instructions stored thereon which, when executed by the one or more computers, cause the one or more computers to perform operations comprising:
   receiving a first sub-set of data, the first sub-set of data defining an entire portion of a digital audio signal;
   processing the first sub-set of data to generate a reconstructed audio signal, the reconstructed audio signal being i) a reconstruction of the entire digital audio signal and ii) having a first fidelity relative to a fidelity of the digital audio signal;
   determining that the first fidelity of the reconstructed audio signal is less than a threshold fidelity and in response, transmitting a first signal for transmission of subsequent sub- sets of data;
   receiving a second sub-set of data, the second sub-set of data comprising data that is different than data of the first sub-set of data;
   processing the second sub-set of data, wherein the the second sub-set of data is useable to obtain an updated reconstructed audio signal, the updated reconstructed audio signal being i) a reconstruction of the entire digital audio signal and ii) having a second fidelity relative to the fidelity of the digital audio signal; and determining that the second fidelity of the updated reconstructed audio signal is greater than the threshold fidelity and in response, transmitting a second signal for ceasing generation of subsequent sub-sets of data based on the digital audio signal.

14. The system of claim 13, wherein the second sub-set of data includes more data than the first sub-set of data.

15. The system of claim 13, the operations further comprising:
receiving a third sub-set of data based on a comparison of a priority of the second sub-set of data to a priority of the third sub-set of data, the third sub-set of data comprising data that is different than data of the first and second sub-sets of data, wherein processing further comprises processing only one of the second sub-set of data and the third sub-set of data, wherein the operations further comprise:
receiving the other of the second sub-set of data and the third sub-set of data; and
processing the other of the second sub-set of data and the third sub-set of data to obtain a further updated reconstructed audio signal having a third fidelity relative to the fidelity of the digital audio signal, the third fidelity of the third version of the reconstructed audio signal greater than the second fidelity.

16. The system of claim 15, wherein the third sub-set of data includes more data than each of the second sub-set of data and the first sub-set of data.

17. The system of claim 15, wherein processing the first sub-set of data comprises up-sampling data of the first data sub-set at an original sampling rate of the data set to provide first up-sampled data, the first version of the reconstructed signal being generated based on the first up-sampled data, and the first data sub-set having been generated using a first sampling rate that is less than the original sampling rate.

18. The system of claim 17, wherein processing one of the second sub-set of data and the third sub-set of data comprises up-sampling data of the one of the second sub-set of data and the third sub-set of data at the original sampling rate to provide second up-sampled data, the second up-sampled data being added to the first version of the reconstructed audio signal to obtain the second version of the reconstructed audio signal, and the one of the second sub-set of data and the third sub-set of data having been generated using a second sampling rate that is less than the original sampling rate and that is greater than the first sampling rate.

19. The system of claim 18, wherein the operations further comprise:
up-sampling data of the other of the second sub-set of data and the third sub-set of data at the original sampling rate to provide third up-sampled data; and
adding the third up-sampled data to the second version of the reconstructed audio signal to obtain a third version of the reconstructed audio signal.

20. The system of claim 13, wherein the first sub-set of data is generated by extracting a first bit of each sample of data of the digital audio signal to provide first extracted data, the first extracted data defining the first sub-set of data and the first bit being determined based on a bit-depth.

21. The system of claim 20, wherein the second sub-set of data is generated by extracting a second bit of each sample of data of the digital audio signal to provide second extracted data, the second extracted data defining the second sub-set of data and the second bit being determined based on the bit-depth.

22. The system of claim 15, wherein the operations further comprise decompressing the first sub-set of data and the one of the second sub-set of data and third sub-set of data.

23. A method, comprising:
receiving a first sub-set of data, the first sub-set of data defining an entire portion of a digital audio signal;
processing the first sub-set of data to generate a reconstructed audio signal, the reconstructed audio signal being i) a reconstruction of the entire digital audio signal and ii) having a first fidelity relative to a fidelity of the digital audio signal;
determining that the first fidelity of the reconstructed audio signal is less than a threshold fidelity and in response, transmitting a first signal for transmission of subsequent sub-sets of data;
receiving a second sub-set of data, the second sub-set of data comprising data that is different than data of the first sub-set of data;
processing the second sub-set of data, wherein the second sub-set of data is useable to obtain an updated reconstructed audio signal, the updated reconstructed audio signal being i) a reconstruction of the entire digital audio signal and ii) having a second fidelity relative to the fidelity of the digital audio signal; and
determining that the second fidelity of the updated reconstructed audio signal is greater than the threshold fidelity and in response, transmitting a second signal for ceasing generation of subsequent sub-sets of data based on the digital audio signal.

24. A non-transitory computer-readable medium coupled to one or more computers and having instructions stored thereon which, when executed by the one or more computers, cause the one or more computers to perform operations comprising:
receiving a first sub-set of data, the first sub-set of data defining an entire portion of a digital audio signal;
processing the first sub-set of data to generate a reconstructed audio signal, the reconstructed audio signal being i) a reconstruction of the entire digital audio signal and ii) having a first fidelity relative to a fidelity of the digital audio signal;
determining that the first fidelity of the reconstructed audio signal is less than a threshold fidelity and in response, transmitting a first signal for transmission of subsequent sub-sets of data;
receiving a second sub-set of data, the second sub-set of data comprising data that is different than data of the first sub-set of data;
processing the second sub-set of data, wherein the second sub-set of data is useable to obtain an updated reconstructed audio signal, the updated reconstructed audio signal being i) a reconstruction of the entire digital audio signal and ii) having a second fidelity relative to the fidelity of the digital audio signal; and
determining that the second fidelity of the updated reconstructed audio signal is greater than the threshold fidelity and in response, transmitting a second signal for ceasing generation of subsequent sub-sets of data based on the digital audio signal.

25. A method of progressively encoding a digital audio signal, comprising:
retrieving a digital audio signal;
processing the digital audio signal to generate a first sub-set of data, the first sub-set of data defining an entire of the digital audio signal;
compressing the first sub-set of data;

transmitting the first sub-set of data for generation of a reconstructed audio signal, the reconstructed audio signal being i) a reconstruction of the entire digital audio signal and ii) having a first fidelity relative to a fidelity of the digital audio signal;

receiving a first signal indicating that the first fidelity of the reconstructed audio signal is less than a threshold fidelity;

in response to receiving the first signal, processing the digital audio signal to generate a second sub-set of data, the second sub-set of data comprising data that is different than data of the first sub-set of data and including more data than the first sub-set of data;

compressing the second sub-set of data;

transmitting the second sub-set of data, wherein the second sub-set of data is useable to obtain an updated reconstructed audio signal, the updated reconstructed audio signal being i) a reconstruction of the entire digital audio signal and ii) having a second fidelity relative to a fidelity of the digital audio signal;

receiving a second signal indicating that the second fidelity of the reconstructed audio signal is greater than the threshold fidelity; and in response to receiving the second signal, ceasing generation of subsequent sub-sets of data based on the digital audio signal.

26. The system of claim 3, wherein the second subset of data comprises data that is not included by the data of the first sub-set of data, and the third sub-set of data comprises data that is not included by the data of the first and second sub-sets of data.

* * * * *

UNITED STATES PATENT AND TRADEMARK OFFICE
CERTIFICATE OF CORRECTION

| | | |
|---|---|---|
| PATENT NO. | : 8,965,545 B2 | Page 1 of 1 |
| APPLICATION NO. | : 12/895258 | |
| DATED | : February 24, 2015 | |
| INVENTOR(S) | : Lloyd et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 85 days.

Signed and Sealed this
Second Day of February, 2016

Michelle K. Lee
*Director of the United States Patent and Trademark Office*